United States Patent
Freeland et al.

(10) Patent No.: US 10,684,162 B2
(45) Date of Patent: Jun. 16, 2020

(54) STRAIN SENSING OPTICAL CABLE WITH ACOUSTIC IMPEDANCE MATCHED LAYERS

(71) Applicant: CORNING RESEARCH & DEVELOPMENT CORPORATION, Corning, NY (US)

(72) Inventors: Riley Saunders Freeland, Corning, NY (US); Michael John Gimblet, Conover, NC (US); Jason Clay Lail, Conover, NC (US); James Arthur Register, III, Hickory, NC (US); David Alan Seddon, Hickory, NC (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 139 days.

(21) Appl. No.: 15/989,480

(22) Filed: May 25, 2018

(65) Prior Publication Data
US 2019/0033125 A1 Jan. 31, 2019

Related U.S. Application Data

(60) Provisional application No. 62/513,017, filed on May 31, 2017.

(51) Int. Cl.
*G02B 6/44* (2006.01)
*G01H 9/00* (2006.01)

(52) U.S. Cl.
CPC ............ *G01H 9/004* (2013.01); *G02B 6/443* (2013.01); *G02B 6/4433* (2013.01); *G02B 6/4434* (2013.01); *G02B 6/4495* (2013.01)

(58) Field of Classification Search
CPC ........ G10K 11/28; G10K 11/30; G01D 5/264; G01D 5/35374; G01D 5/35377;
(Continued)

(56) References Cited

U.S. PATENT DOCUMENTS 9,459,363 B2   10/2016  Tenghamn
10,173,381 B2 *  1/2019  Xia .................... G01H 9/004
(Continued)

FOREIGN PATENT DOCUMENTS

CN    102879876    *  1/2013
WO    2016144337 A1   9/2016

OTHER PUBLICATIONS

"Acoustic Velocity, Impedance Reflection, Transmission, Attenuation, and Acoustic Etalons"; Acoustic Velocity; Iowa Doppler; 5 pages; Online Available: http://www.iowadoppler.com/documents/acoustic-experiments.pdf.
(Continued)

*Primary Examiner* — Jacques M Saint Surin
(74) *Attorney, Agent, or Firm* — William D. Doyle

(57) ABSTRACT

A vibration sensing optical fiber cable is provided. The cable includes at least one optical fiber embedded in the cable jacket such that vibrations from the environment are transmitted into the cable jacket to the optical fiber. The cable is configured in a variety of ways, including through spatial arrangement of the sensing fibers, through acoustic impedance matched materials, through internal vibration reflecting structures, and/or through acoustic lens features to enhance sensitivity of the cable for vibration detection/monitoring.

22 Claims, 10 Drawing Sheets

(58) Field of Classification Search
CPC ...... G01D 5/268; G01H 9/004; G02B 6/4429; G02B 6/4434
USPC .......................................................... 73/655
See application file for complete search history.

(56) References Cited

U.S. PATENT DOCUMENTS

| | | | |
|---|---|---|---|
| 10,386,593 B2* | 8/2019 | Freeland | G01L 1/24 |
| 2010/0281985 A1* | 11/2010 | Kumagai | G01H 9/004 |
| | | | 73/655 |
| 2012/0111104 A1 | 5/2012 | Taverner et al. | |
| 2012/0179378 A1* | 7/2012 | Duncan | E21B 47/123 |
| | | | 702/8 |
| 2012/0222487 A1 | 9/2012 | Hill et al. | |
| 2012/0227504 A1* | 9/2012 | Goldner | G01H 9/00 |
| | | | 73/655 |
| 2016/0169711 A1 | 6/2016 | Blakley et al. | |
| 2016/0202437 A1 | 7/2016 | Emmerich et al. | |
| 2017/0075029 A1 | 3/2017 | Cuny et al. | |
| 2017/0259513 A1* | 9/2017 | Xia | G01H 9/004 |
| 2017/0260847 A1 | 9/2017 | Xia et al. | |
| 2017/0260848 A1* | 9/2017 | Xia | G01V 1/40 |
| 2018/0087372 A1 | 3/2018 | Stokely et al. | |
| 2018/0348017 A1* | 12/2018 | Freeland | G10K 11/28 |

OTHER PUBLICATIONS

Lochab et al; "Acoustic Behaviour of Plastics for Medical Applications"; Indian Journal of Pure & Applied Physics; vol. 42, pp. 595-599. Aug. 2004.

Oelze et al: "Measurement of Attenuation and Speed of Sound in Soils", Soil Sci. Soc. Am. J. 66; (2002) pp. 788-796.

Onda Corporation, "Acoustic Properties of Plastics", 2 Pages; Updated April 11, 2013; Online Available: http://www.ondacorp.com/images/Plastics.pdf.

The Engineering Toolbox; Speed of Sound Formulas; 4 Pages; Downloaded Aug. 15, 2018; http://www.engineeringtoolbox.com/speed-sound-d_82.html.

Williams; "An Acoustic Ground Impedeance Measurement"; Army Research Laboratory, ARL-TN-221: July 2004; 22 Pages.

International Search Report and Written Opinion PCT/US2018/034667 dated Oct. 4, 2018, 13 Pgs.

* cited by examiner

STRAIN SENSING OPTICAL CABLE WITH ACOUSTIC IMPEDANCE MATCHED LAYERS

PRIORITY APPLICATION

This application claims the benefit of U.S. Provisional Application No. 62/513,017, filed on May 31, 2017, the content of which is relied upon and incorporated herein by reference in its entirety.

BACKGROUND

The disclosure relates generally to a strain sensing fiber-optical cable configured for strain sensing and more particularly to a fiber optic cable configured for enhanced sensitivity to strain and/or vibration sensing. Strain within an optical fiber can be measured by measuring the change in a transmission property of a signal along the optical fiber (e.g., Rayleigh scattering of an optical signal carried along the fiber). Vibrations in an environment in contact with an optical fiber cable cause dynamic strain within the optical fibers of the cable, which in turn can be monitored/detected by measuring/detecting the strain induced scattering, for example measuring/detecting the strain-induced changes in the amplitude and/or phase of the scattered signal. Some vibration detection systems are configured to detect specific strain events and are able to indicate where along the length of the cable the strain event occurs. In addition, systems may be able to detect/monitor a dynamic or static strain signature, strain magnitude, and strain duration of the event. Typical systems have along the length detection channels about every 5-10 m. So for example a 1 km long system would have 200-100 detection channels.

SUMMARY

One embodiment of the disclosure relates to a vibration sensing cable including a cable jacket. The cable jacket includes an outer layer defining an outermost surface of the cable jacket, and the outer layer is formed from a first polymer material. The cable jacket includes an inner layer surrounded at least in part by the outer layer, and the inner layer is formed from a second polymer material. The first polymer material has an acoustic impedance that is less than an acoustic impedance of the second polymer material. The cable includes a vibration sensing optical fiber embedded within the cable jacket and a tensile strength element embedded in the cable jacket.

An additional embodiment of the disclosure relates to a vibration monitoring system including a vibration sensing cable. The vibration sensing cable includes a cable jacket defining an outer surface of the vibration sensing cable and a sensing optical fiber embedded within the cable jacket. The outer surface of the vibration sensing cable is in contact with an environment such that vibrations within the environment are transmitted from the environment into the cable jacket. The cable jacket is configured such that at least 25% of the power of vibrations in the environment that are incident on the outer surface of the cable jacket is transmitted through the cable jacket to the sensing optical fiber. The system includes vibration monitoring electronics coupled to the vibration sensing cable and configured to determine an aspect of vibration within the environment based on optical scattering, caused by the vibrations, of an optical signal within the sensing optical fiber.

An additional embodiment of the disclosure relates to a system for detecting vibrations in an environment including a vibration sensing cable. The vibration sensing cable includes a cable jacket formed from a first material and a sensing optical fiber embedded within the cable jacket. The system includes an impedance matching material located between the cable jacket and the environment, and the impedance matching material is in contact with the environment and with the cable jacket such that vibrations within the environment are transmitted from the environment into the impedance matching material then into the cable jacket and through the cable jacket to the sensing optical fiber. The impedance matching material has an acoustic impedance, $Z2$, and a portion of the environment in contact with the impedance matching material has an acoustic impedance, $Z1$. $Z2$ is within 2 MRayl of $Z1$.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
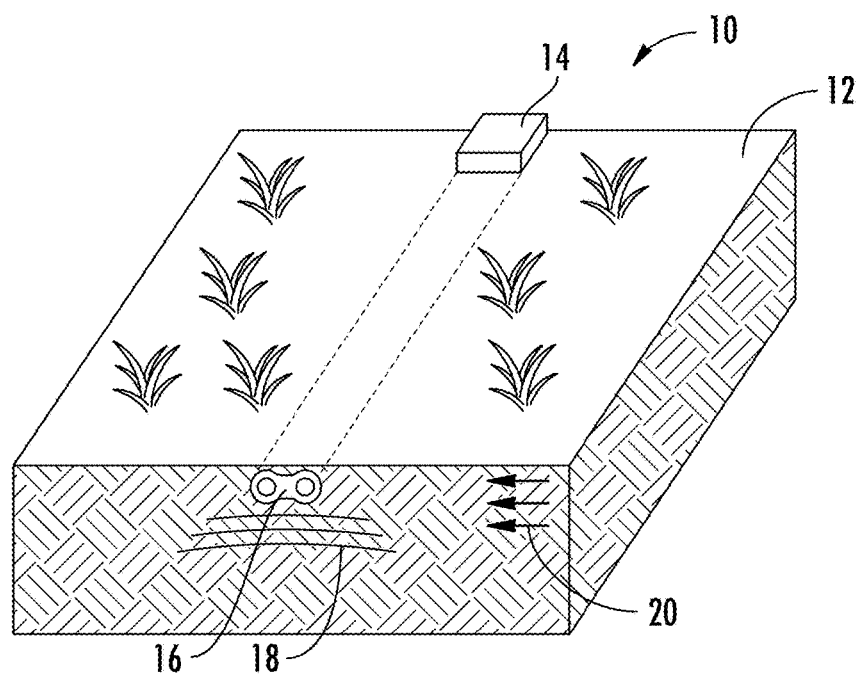
FIG. 1 shows a schematic view of a system for monitoring/detecting vibration utilizing a fiber optic cable according to an exemplary embodiment.

Referring generally to the figures, various embodiments of an optical fiber cable configured for sensing strain is shown and described. In specific embodiments, the optical fiber cables discussed herein are configured to detect vibration applied to the cable body. Vibration experienced by optical fibers within a cable cause scattering of optical signals within the optical fiber which can be detected/monitored such that the optical cable can function as a vibration sensor/detector. Such vibration sensors may be useful in variety of applications including perimeter monitoring applications, pipeline monitoring applications, etc.

For example, in a perimeter-monitoring application, the vibration sensing optical fiber cable is buried in the ground. Vibration within the ground (e.g., from a vehicle, person, etc. moving near or over the perimeter) is transmitted into the cable causing change in the scattering of the optical signal within the optical fibers of the cable. Detection electronics are connected to the cable to detect/monitor the scattering of the optical signal and to provide an indication/alarm when vibration indicative of perimeter breach are detected. The optical cable embodiments discussed herein can be utilized in other vibration monitoring applications, including pipeline line leak/breakage monitoring. In various embodiments, the sensing systems discussed herein may utilize a variety of sensing modalities, including monitoring/sensing changes in Rayleigh, Raman and/or Brillioun scattering. In some embodiments, the optical cable embodiments discussed herein are used in distributed acoustic sensing (DAS) systems or distributed strain sensing (DSS) systems, and in other embodiments, the optical cable embodiments discussed herein used in distributed temperature sensing systems. In some embodiments, the optical cable embodiments discussed herein combine vibration monitoring applications (e.g., DAS or DSS applications) and temperature monitoring applications (e.g., DTS applications). As will generally be understood DTS applications utilize measurement of Raman scattering for temperature detection.

As discussed in more detail herein, in order to improve vibration detection, Applicant has to develop a number of optical fiber cable designs configured to improve vibration transmission into the cable jacket and into the optical fiber. By increasing the transmission of vibration from the environment (e.g., the ground, monitored pipeline, etc.) into the cable jacket and ultimately into the optical fiber, Applicant believes that the cable design discussed herein increases the sensitivity of the cable for vibration detection.

As will generally be understood regarding vibration transmission, the amount of vibrational energy transmitted across an interface between two materials is inversely related to the difference in acoustic impedances of the two materials. In general, the percentage of vibrational power reflected from an interface, R, is governed by the following Equation 1:

$$R = \left(\frac{(Z_2 - Z_1)}{(Z_2 + Z_1)}\right)^2$$

where $Z_1$ and $Z_2$ are the acoustic impedances of the two materials that form the interface. Thus, the more similar the acoustic impedances of materials forming the interface, the greater the percentage of vibrational energy transmitted across the interface and the lower the percentage of vibrational energy reflected off of the interface. Similarly, the fewer material interfaces that a vibration/sound wave needs to traverse, the greater the vibration transmission will be.

In specific embodiments, the optical fiber cable embodiments discussed herein are configured to improve/facilitate vibration transmission from the environment and to the sensing optical fibers of the cable. For example, in various embodiments (as shown for example in FIGS. 2-8), cables discussed herein are designed to position the sensing optical fibers within the cable jacket and relative to other cable components (e.g., strength members, armor layers, etc.) in a manner that increases vibration transmission to the sensing optical fibers. For example, in various embodiments, the sensing fiber(s) of the cable embodiments discussed herein are located adjacent to the surface of the cable and positioned to minimize the extent to which other cable components, such as strength elements, block or shield the sensing optical fibers from incoming vibrations. In such embodiments, the sensing optical fiber(s) are positioned external to the strength elements such that the optical fibers have a large, unobstructed radial field of view to the outer surface of the optical fiber cable. In addition, in some embodiments, a pair of optical fibers are located on either side of the strength member(s) such that the cable provides sensing fibers that have unobstructed views of vibrations entering the cable jacket from either lateral side of the cable and from above and below the cable.

In addition to (or instead of) positioning of the sensing optical fibers relative to the cable jacket and cable components, in various embodiments, an impedance matching material is utilized between the vibration-containing environment and the vibration sensing cable to increase sensitivity for vibration detection. In general, Applicant believes that use of an impedance matching material as discussed herein decreases the proportion of vibrational power reflected off interfaces between the environment and the sensing optical fiber. In some embodiments, the impedance matching material is an outer layer of the cable jacket, and in other embodiments, the impedance matching material is a material added to the environment adjacent the vibration sensing cable.

Further, in various embodiments, sensing optical fiber cables discussed herein utilize one or more aspect of cable design to focus vibrational energy onto the sensing optical fiber(s). In some embodiments, vibration sensing cables discussed herein include one or more acoustic reflectors embedded in the cable jacket that reflect vibrations toward the optical fiber. In yet additional embodiments, the cable jacket may have an outer surface shaped to direct vibrations toward the sensing optical fiber via refraction as the vibration is transmitted into the cable jacket. In yet additional embodiments, the outer radius of curvature of the cable jacket may be sized relative to the radius fiber to increase the amount of vibrational energy that is directed toward the sensing optical fiber via refraction as the vibration is transmitted into the cable jacket.

Referring to FIG. 1, a system 10 for detecting vibration in an environment, such as ground 12, is shown according to an exemplary embodiment. In general, system 10 includes vibration sensing electronics 14 and a strain or vibration sensing cable, shown as optical fiber cable 16. In general, cable 16 includes one or more vibration sensing optical fibers, and sensing electronics 14 are configured to detect changes in scattering of the optical signal carried within the optical fiber(s) of cable 16 indicative of vibration within ground 12. Vibration sensing electronics are coupled to the cable 16 and are configured to determine an aspect of vibration in the environment (e.g., vibration occurrence, vibration magnitude, vibration duration, vibration direction, etc.) based on optical scattering of an optical signal within the sensing optical fiber(s) of cable 16 that is caused by the vibrations transmitted into cable 16.

For example, vibrations detected in ground 12 may include vibrations 18 traveling upward (e.g., vibrations reflected off of bedrock) and/or vibrations 20 traveling horizontally from a vibration source. Sensing electronics 14 may be configured to log, store, process, provide alerts, etc. in response to detected vibrations that are indicative of an event that system 10 is configured to monitor. For example, in a perimeter monitoring application, system 10 may be configured to detect vibrations associated with movement (e.g., people, vehicles, etc.) crossing or approaching cable 16. In other embodiments, the monitored environment may be a pipeline or other conduit, and system 10 is configured to detect vibrations associated with a leak or break in the pipeline. It should also be understood that cable 16 of system 10 may be any one of the cable embodiments discussed herein. Similarly, in some embodiments, cable 16 may be an optical fiber cable including any combination of cable features, and specifically any of the vibration detection enhancement features of any of the cable embodiments discussed herein.

Figure 2:
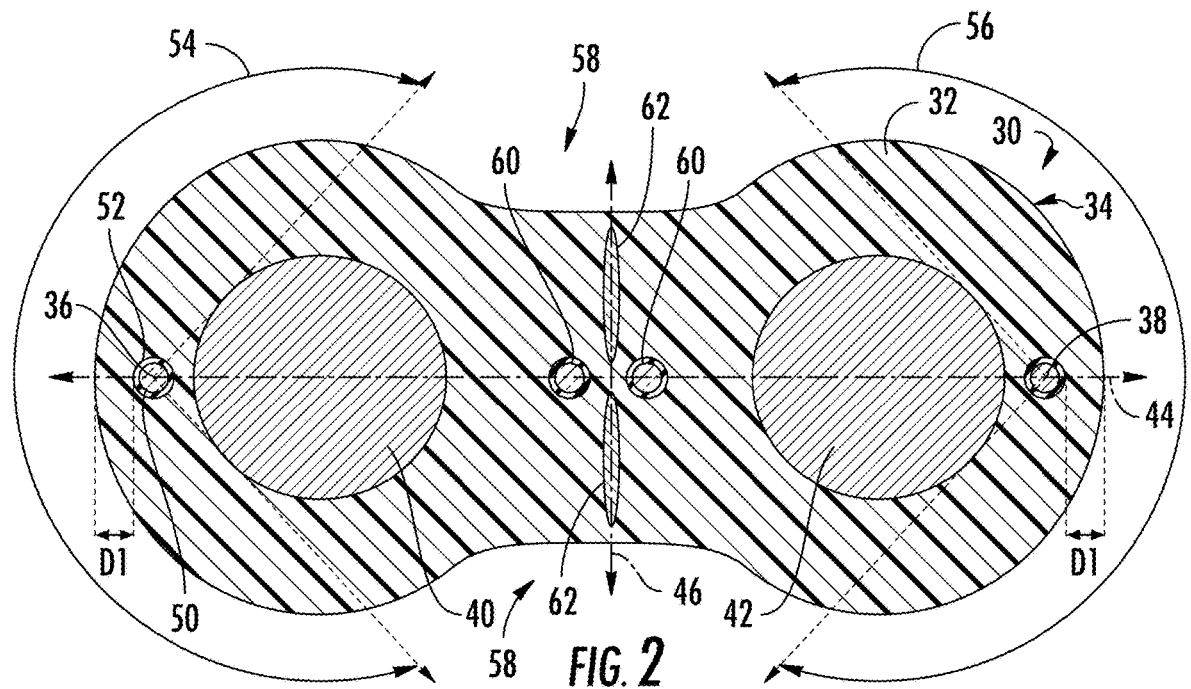
FIG. 2 shows a longitudinal cross-sectional view of a vibration sensing fiber optic cable, according to an exemplary embodiment.

Referring to FIG. 2, a cross-sectional view of a strain (e.g., dynamic strain) or vibration sensing optical fiber cable 30 is shown according to an exemplary embodiment. Cable 30 includes a cable jacket, outer jacket or sheath, shown as jacket 32. In specific embodiments, jacket 32 is formed from one or more layer of an extruded material (e.g., an extruded polymer material) that supports the other components of cable 30. In the embodiment shown, jacket 32 is the outer layer of cable 30 and forms outermost surface 34 of cable 30. In this arrangement, when viewed in the longitudinal cross-section of FIG. 2, outer surface 34 is a contiguous surface that surrounds the various internal components (e.g., sensing fibers, strength elements, etc. as discussed below) of cable 30.

As can be seen in FIG. 1, when cable 30 is located within the desired environment (e.g., within ground 12), outer surface 34 is the surface of cable 30 that engages or interfaces with the environment carrying the vibrations to be detected/monitored using cable 30. The material of jacket 32 may be any material used in cable manufacturing, such as polyethylene, polyvinyl chloride (PVC), polyvinylidene difluoride (PVDF), nylon, polyester or polycarbonate and their copolymers, polyurethane and specifically thermoplastic polyurethane. In a specific embodiment, the material of cable jacket 32 may be a material that has an acoustic impedance selected that is similar/the same as the acoustic impedance the environment. For example, in one embodiment where the vibration-carrying environment is the ground, jacket 32 may be formed from a material, such as medium density polyethylene, having an acoustic impedance less than 2 MRayl, specifically between 1 and 2 MRayl, and even more specifically between 1.5 and 2 MRayl. In some other embodiments, jacket 32 is formed from a TPU material having an acoustic impedance of between 0.8 and 1 MRayl and specifically of 0.85 to 0.95 MRayl.

Cable 30 includes at least one strain sensing or vibration sensing optical fiber, shown as first sensing optical fiber 36 and second sensing optical fiber 38, coupled to jacket 32. As shown in FIG. 2, sensing optical fibers 36 and 38 is located within jacket 32 and, specifically, are embedded within the material of jacket 32. In this embodiment, outer surfaces of sensing optical fibers 36 and 38 are in contact with and are coupled to the material of jacket 32 such that vibrations experienced by cable 30 are transmitted effectively to sensing optical fibers 36 and 38. In specific embodiments, the outer surfaces of sensing optical fibers are defined by an outer polymer coating 52 (e.g., a UV cured acrylate coating) that surrounds a glass core and cladding layers, shown generally together at 50, in FIG. 2.

In some embodiments, to facilitate transmission of vibrational energy from the environment to sensing fibers 36 and 38, sensing fibers 36 and 38 may have a low level of excess fiber length (EFL). Low levels of EFL help ensure that fiber strain-inducing vibrations are efficiently transmitted from the environment, to cable jacket 32 and to sensing fibers 36 and 38. In specific embodiments, EFL of sensing fibers 36 and 38 can be expressed in relation to the longitudinal length of cable jacket 32 and/or to the longitudinal length of strength elements 40 and 42. In specific embodiments, sensing fibers 36 and 38 each have a longitudinal length within plus or minus 0.5%, specifically plus or minus 0.1%, more specifically plus or minus 0.05% and even more specifically, plus or minus 0.01% of the longitudinal length of strength member 40, strength member 42 and/or jacket 32.

In various embodiments, cable 30 includes one or more elongate tensile strength element, shown as strength members 40 and 42. In general, strength members 40 and 42 act to provide structural and tensile support to cable 30. In the embodiment shown, strength members 40 and 42 are elongate, generally cylindrical or rod-like members embedded within the material of jacket 32. In these embodiments, strength members 40 and 42 have outer surfaces that are coupled to the material of jacket 32 such that the material of jacket 32 is in contact with the outer surfaces of strength members 40 and 42. Strength members 40 and 42 may generally be formed from a rigid material, more rigid than the material of cable jacket 32, and in various embodiments, strength members 40 and 42 may be metal, braided steel, glass-reinforced plastic, fiber glass, fiber glass yarns or other suitable material.

While strength members 40 and 42 provide strength to cable 30, the strong materials that form strength members 40 and 42 typically have high acoustic impedances, and thus, will tend to reflect a significant portion of vibrational energy that is transmitted on a path to sensing fibers 36 and 38 that intersects strength members 40 and/or 42. To limit the vibration blocking that may otherwise be caused by strength members 40 and 42, cable 30 is structured in a variety of ways in order to facilitate exposure of sensing fibers 36 and 38 to the vibrations that cable 30 receives from the environment. For example, cable jacket 32, sensing fibers 36 and 38 and strength elements 40 and 42 may be shaped and/or arranged in a manner that Applicant believes will increase the amount of vibrational energy transmitted to sensing fibers 36 and 38. For example, as shown in FIG. 2, sensing fibers 36 and 38 are located adjacent lateral or minor outer surfaces of cable jacket 32 with both strength members 40 and 42 located toward the midpoint of cable jacket 32. As will be explained in more detail below, Applicant believes that this positioning allows sensing fibers 36 and 38 to be more directly exposed to vibrations from the environment while limiting the vibration blocking effect of strength members 40 and 42.

FIG. 2 shows a cross-sectional view taken perpendicular to the length or longitudinal axis of cable 30. In this view, cable 30 defines a first axis, shown as horizontal axis 44, and a second axis, shown as vertical axis 46. As shown, horizontal axis 44 and vertical axis 46 are perpendicular to each other and intersect at the central position of the longitudinal axis. As shown in FIG. 2, cable 30 is arranged such that horizontal axis 44 intersects sensing fibers 36 and 38 and intersects strength members 40 and 42 with strength members 40 and 42 being located between sensing fibers 36 and 38 along horizontal axis 44. In the specific embodiment shown in FIG. 2, horizontal axis 44 intersects the longitudinal center points of sensing fibers 36 and 38 and of strength members 40 and 42.

Further, sensing fiber 36 is located on the opposite side of vertical axis 46 from sensing fiber 38, and strength member 40 is located on the opposite side of vertical axis 46 from strength member 42. Applicant believes that by positioning sensing fibers 36 and 38 along axis 44 (e.g., which is typically referred to as the cable's neutral axis) limits the amount of tensile and compressive strain that sensing fibers 36 and 38 experience during normal bending and handling of cable 30. By limiting these unwanted sources of strain, the optical scattering associated with bending and handling is reduced, which, in turn, improves the sensitivity (e.g., decreases the signal to noise ratio) of cable 30 to vibration-induced strain.

Further, sensing fibers 36 and 38 may be positioned close to outer surface 34. In various embodiments, sensing fibers 36 and 38 are located adjacent to outer surface 34 of cable jacket 32 such that a minimum distance, shown as D1, from the outer surface of sensing fibers 36 and 38 to the outer surface 34 is less than or equal to 0.5 mm. Further, in the cable arrangement/shape of the embodiment of FIG. 2, D1 for both sensing fibers 36 and 38 reside along horizontal axis 44. However, in other embodiments, jacket 32 may have other shapes and/or sensing fibers 36 and 38 may be positioned such that the minimum distance represented by D1 does not lie along horizontal axis 44.

In such embodiments, Applicant believes that by positioning sensing fibers 36 and 38 close to outer surface 34 (and further away from strength elements 40 and 42) vibration reception may be enhanced by decreasing the vibration blockage/reflection that may otherwise be caused by strength elements 40 and 42. Similarly, by positioning sensing fibers 36 and 38 near outer surface 34, the degree to which the material of jacket 32 attenuates the vibrations traveling through jacket 32 to sensing fibers 36 and 38 is decreased (as compared to sensing fibers buried deeper with the material of a cable jacket).

Figure 17A:
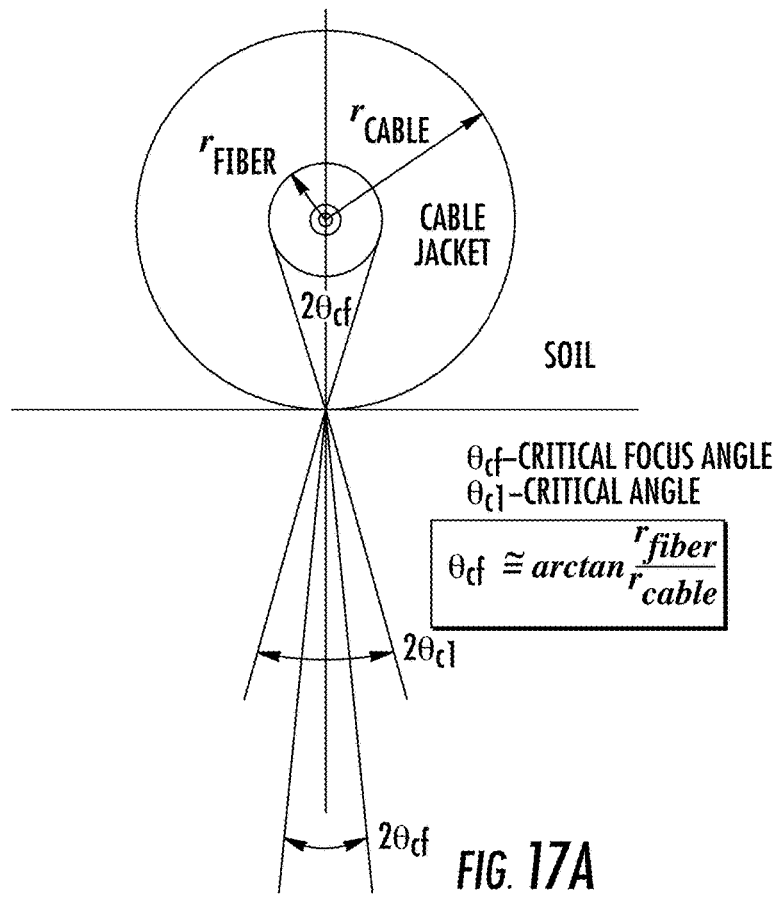
FIGS. 17A and 17B show a schematic diagram and a plot of cable radius vs. angle of refractive energy transfer for a vibration sensing cable model that takes into account the radius of curvature and dimensions of the cable jacket and fiber and how they apply to calculate a maximum potential angle for direct energy transfer.
Figure 17B:
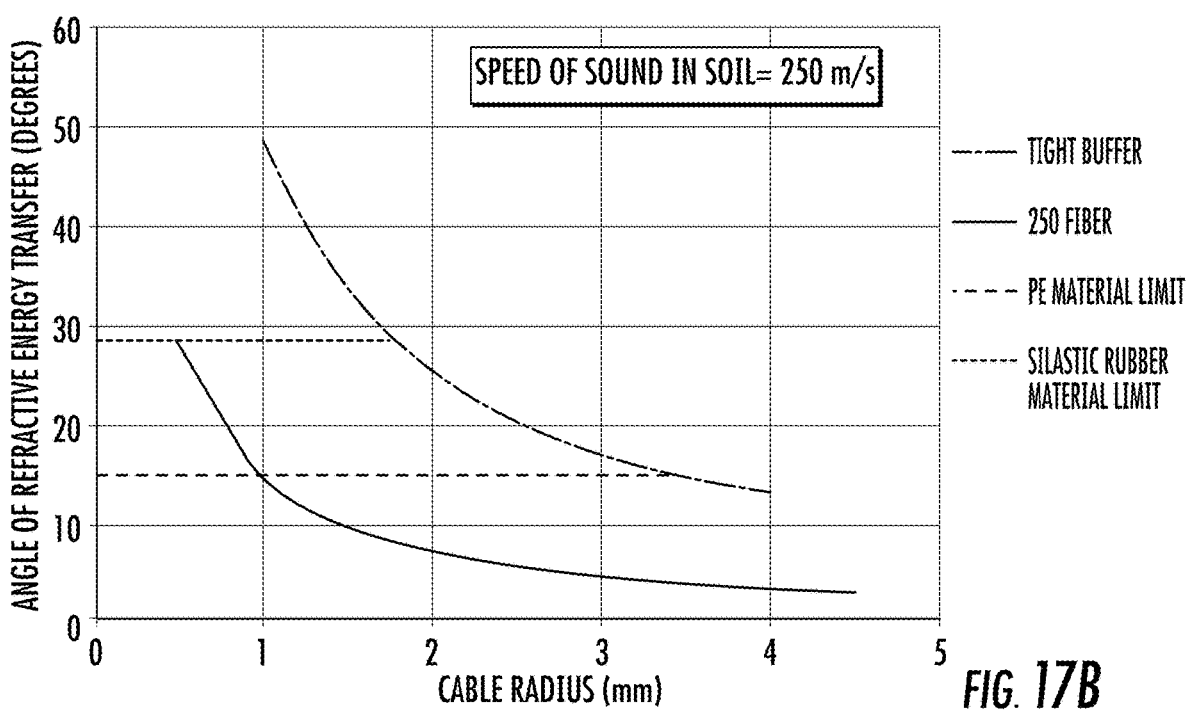

Further, cable 30 may be shaped in a manner to further facilitate use of cable 30 in a vibration sensing application. For example, as shown in FIG. 2, an outer dimension of cable jacket 32 taken along horizontal axis 44 is greater than an outer dimension of cable jacket 32 taken along vertical axis 46. In a specific embodiment, cable jacket 32 has an oblong shape such that the outer dimension of cable jacket 32 taken along horizontal axis 44 is at least twice the outer dimension of cable jacket 32 taken along vertical axis 46. In a specific embodiment, the maximum outer dimension of cable jacket 32 in the direction of vertical axis 46 is less than or equal to 2 mm, which as discussed below regarding FIGS. 17A and 17B, is believed to provide for improved refractory channeling of acoustic waves toward sensing fibers 36 and 38. This shape facilitates the outward, shallow positioning of sensing fibers 36 and 38. The preferential bend characteristics may also facilitate horizontal positioning (e.g., burying) of cable 30 within the ground via a tool such as a vibratory plow.

Still referring to FIG. 2, the shape of cable jacket 32 and the positioning of sensing fibers 36 and 38 relative to strength members 40 and 42 allows sensing fibers 36 and 38 to have a high level of direct exposure to vibrations transmitted into cable jacket 32. As shown in FIG. 2, this high level exposure is shown as the unobstructed field of view that each sensing fiber 36 and 38 has to a portion of outer surface 34 of cable 30. As used herein, the field of view of sensing fiber 36 and 38 relates to the portion of outer surface 34, measured in terms of the labeled arc angle, that has only the material of jacket 32 located between the outer surface 34 and sensing fiber 36 and 38 (e.g., without any intervening blocking structures). This parameter provides an indication of the extent to which vibrations are permitted to travel directly through jacket 32 to sensing fibers 36 and 38 without other cable structures, such as strength elements 40 and 42, blocking/reflecting vibrations before they reach sensing fibers 36 and 38.

As shown in FIG. 2, sensing fiber 36 has an unobstructed field of view of outer surface 34 represented by arc 54, and sensing fiber 38 has an unobstructed field of view of outer surface 34 represented by arc 56. As shown, the unobstructed field of views 54 and 56 of sensing fibers 36 and 38 are uninterrupted in that they provide a continuous view of outer surface 34 along the entire arc angle shown. In various embodiments, unobstructed field of views 54 and 56 have arc angles greater than 180 degrees, specifically are between 180 degrees and 300 degrees and more specifically are between 180 degrees and 270 degrees. As shown in FIG. 2, unobstructed views 54 and 56 face in opposite directions from each other and both are symmetric vertically about horizontal axis 44. As can be seen in FIG. 2, the positioning of sensing fibers 36 and 38 provides for unblocked vibration reception from a large portion of potential vibration transmission directions around the perimeter of cable 30.

Further referring to FIG. 2, cable 30 may also include one or more additional optical fibers 60. Optical fibers 60 are located toward the center of cable jacket 32 along horizontal axis 44. In this arrangement, horizontal axis 44 intersects additional optical fibers 60 and additional optical fibers 60 are located between sensing fibers 36 and 38 and between strength elements 40 and 42 along horizontal axis 44.

In specific embodiments, additional optical fibers 60 may be additional vibration/strain sensing optical fibers embedded within jacket 32 and having a low EFL as discussed above regarding sensing fibers 36 and 38. In such embodiments, additional sensing optical fibers 60 may provide unobstructed fields of view to the upper and lower central portions 58 of outer surface 34 for which sensing fibers 36 and 38 do not have unobstructed views. In addition, by providing additional sensing fibers 60 at different spatial positioning along axis 44, cable 30 allows system 10 to be configured to determine various additional characteristics of vibration within the ground, such as directionality of the vibration waves, based on the differential response of sensing fibers 36, 38 and 60 when exposed to a particular vibration. In other embodiments, the one or more additional optical fibers 60 may be telecommunications optical fibers. In various embodiments, additional fibers 60 may be in the form of an optical fiber ribbon supported by cable jacket 32.

In addition to the various features discussed above to improve sensitivity to vibration, aspects of cable 30 may also facilitate use, deployment and handling of cable 30. For example, in one embodiment, the oblong shape and strength element positioning of cable 30 results in a fiber with a preferential bend characteristic such that cable 30 tends to bend in the direction of vertical axis 46. This preferential bend characteristic may facilitate deployment of cable 30 in the horizontal position (e.g., as shown in FIG. 2) via burying equipment such as burying via vibratory plow equipment. In addition, cable jacket 32 may have co-extruded tear features 62 that facilitate access to fibers 36, 38 and 60 as may be needed for splicing to other optical fiber cables and/or for connection to sensing electronics 14.

Figure 3:
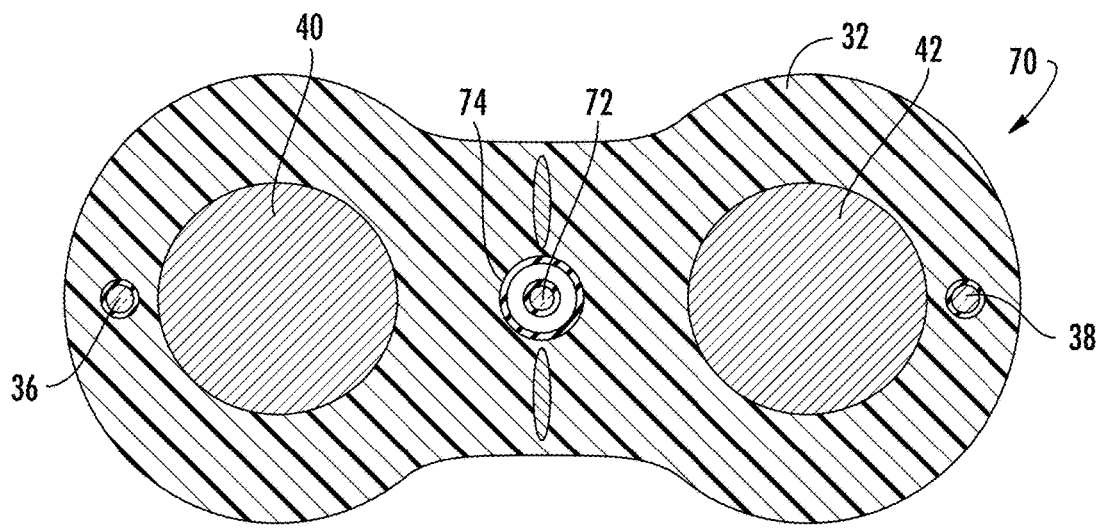
FIG. 3 shows a longitudinal cross-sectional view of a vibration sensing fiber optic cable, according to another exemplary embodiment.

Referring to FIG. 3, a strain or vibration sensing optical fiber cable 70 is shown according to an exemplary embodiment. Cable 70 is substantially the same as cable 30, except for the differences discussed herein. Cable 70 includes one or more additional optical fibers, shown as a third optical fiber 72, located within a buffer tube 74. Third optical fiber 72 is positioned between sensing fibers 36 and 38 along the horizontal axis 44, and generally is located at the center of cable 70 in both the vertical and horizontal positions.

In specific embodiments, third optical fiber 72 is a strain-isolated optical fiber that has a greater level of EFL than fibers 36 and 38 such that third optical fiber 72 does not experience strain/vibrations experienced by cable 70. In some such embodiments, third optical fiber 72 has a longitudinal length that is at least 0.01% greater. In such embodiments, third optical fiber 72 acts as a temperature-sensing fiber allowing system 10 to account for the effect that temperature has on the Raman scattering of optical signals transmitted on fibers 36 and 38. In this arrangement, third optical fiber 72 provides a stress-free optical fiber that provides a baseline level scattering that is utilized by system 10 to improve the accuracy of vibration/strain detection based on the optical scattering measured on sensing fibers 36 and 38. In some embodiments, the temperature reading from third optical fiber 72 may be utilized to provide DTS functionality to cable 70.

Figure 4:
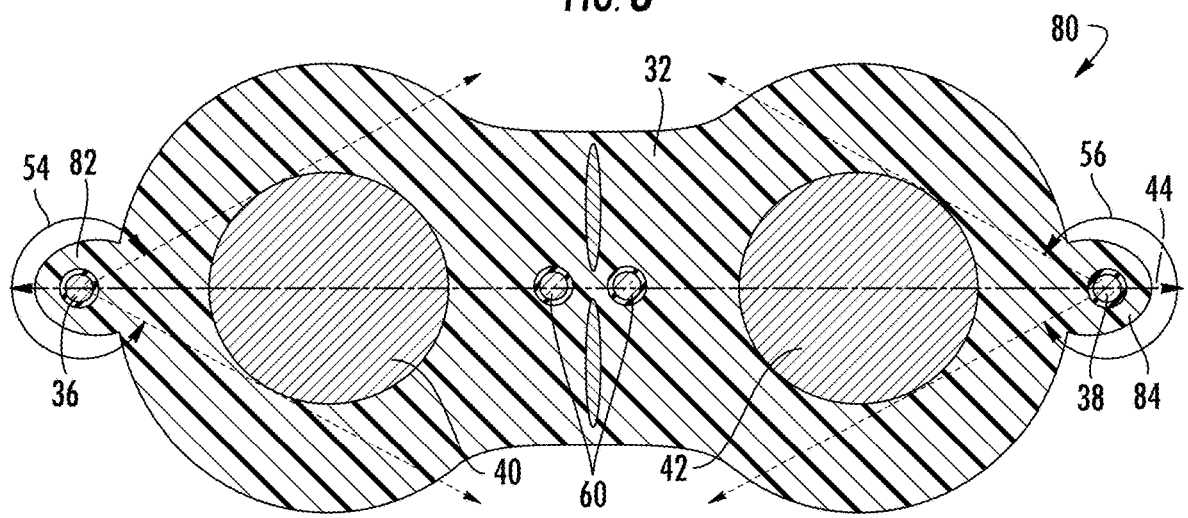
FIG. 4 shows a longitudinal cross-sectional view of a vibration sensing fiber optic cable, according to another exemplary embodiment.

Referring to FIG. 4, a strain or vibration sensing optical fiber cable 80 is shown according to an exemplary embodiment. Cable 80 is substantially the same as cable 30, except for the differences discussed herein. Cable 80 is configured to further increase the unobstructed fields of view 54 and 56 by extending the spacing along horizontal axis 44 between sensing fibers 36 and 38 and strength members 40 and 42, respectively.

Cable 80 includes a pair of ribs, shown as ribs 82 and 84 that extend outward from cable jacket 32 in the direction along horizontal axis 44. Sensing fiber 36 is embedded in the material of rib 82, and sensing fiber 38 is embedded in the material of rib 84. In general, ribs 82 and 84 are protruding ribs that extend the entire longitudinal length of cable 80. In the specific embodiment shown, ribs 82 and 84 are formed from the same material and are integral and continuous with the material of cable jacket 32. In specific embodiments, ribs 82 and 84 are formed during extrusion of the jacket polymer material along with the rest of cable jacket 32. In a specific embodiment, ribs 82 and/or 84 are removable (e.g., via tearing) from the remainder of cable jacket 32. The ability to remove ribs 82 and 84 may also allow coiling of fibers 36 and 38 for local access or an improved point location for acoustic signal.

As can be seen in FIG. 4, by shifting the positioning of sensing fibers 36 and 38 further away from strength elements 40 and 42, respectively, the arc angles of the unobstructed field of views 54 and 56 of sensing fibers 36 and 38 can be increased. In the embodiment shown in FIG. 4, the arc angles of the unobstructed field of views 54 and 56 are greater than 270 degrees, specifically are between 270 degrees and 320 degrees, and more specifically are between 290 degrees and 310 degrees.

In addition, as shown in FIG. 4, ribs 82 and 84 have a relatively small cross-sectional width and height, compared to the diameter of sensing fibers 36 and 38, which allows sensing fibers 36 and 38 to reside close the outer surfaces of ribs 82 and 84. Thus, by embedding sensing fibers 36 and 38 within ribs 82 and 84, a larger portion (compared to cable 30) of the circumference of sensing fibers 36 and 38 is separated from the environment only by a thin layer of cable jacket material. In a specific embodiment, more than 180 degrees of the circumference of sensing fibers 36 and 38 is less than 0.5 mm from the outer surfaces of ribs 82 and 84. By decreasing the amount of jacket material that vibrations from a wide degree of angles must travel through before reaching sensing fibers 36 and 38, the vibration attenuation that occurs within the jacket material is decreased, which in turn is believed to increase the sensitivity of cable 80 to vibration detection.

Figure 5:
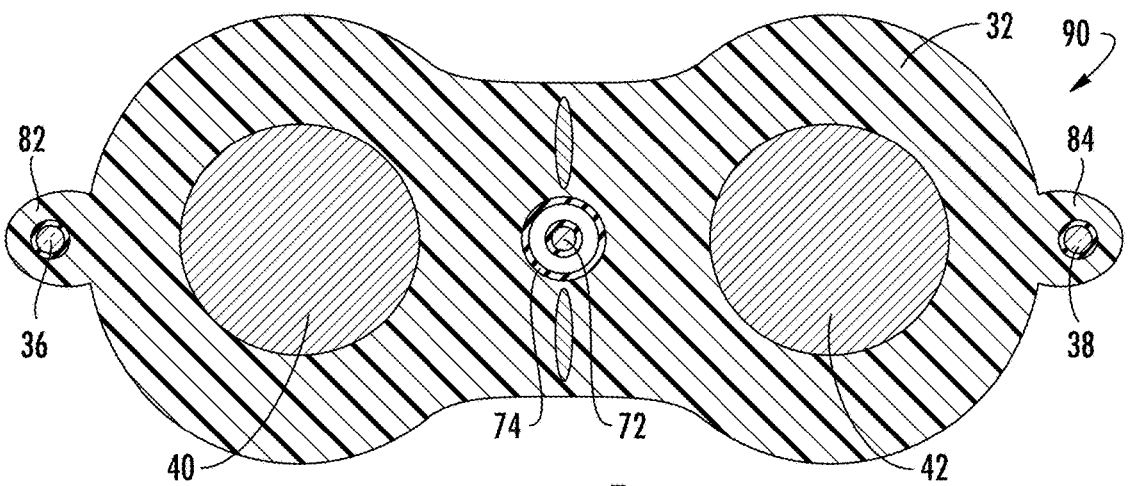
FIG. 5 shows a longitudinal cross-sectional view of a vibration sensing fiber optic cable, according to another exemplary embodiment.

Referring to FIG. 5, a strain or vibration sensing optical fiber cable 90 is shown according to an exemplary embodiment. Cable 90 is substantially the same as cable 80, except for the differences discussed herein. Cable 90 includes one or more strain isolated optical fiber 72 located within tube 74 as discussed above regarding cable 70.

Figure 6:
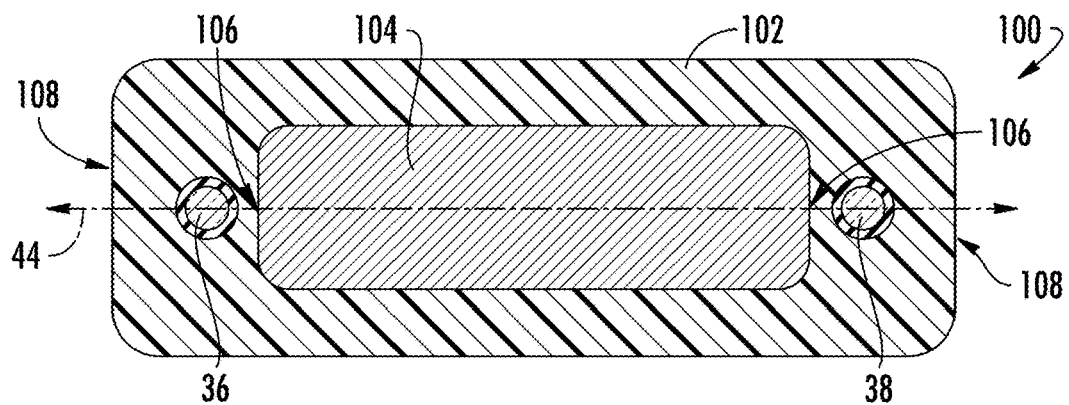
FIG. 6 shows a longitudinal cross-sectional view of a vibration sensing fiber optic cable, according to another exemplary embodiment.

Referring to FIG. 6, a strain or vibration sensing optical fiber cable 100 is shown according to an exemplary embodiment. Cable 100 is substantially the same as cable 30, except for the differences discussed herein. Cable 100 includes rectangular shaped cable jacket 102.

Cable 100 includes a single, centrally located strength element 104 embedded in cable jacket 102. Strength element 104 is a non-round strength element that is positioned within cable jacket 102 such that the major axis of strength element 104 is generally aligned with the horizontal axis 44 of cable 100. In the specific embodiment shown, strength element 104 has a generally rectangular cross-sectional shape.

As shown in FIG. 6, strength element 104 is located between sensing fibers 36 and 38 such that the major axis of strength element 104 is aligned with sensing fibers 36 and 38. In this arrangement, sensing fibers 36 and 38 are embedded in cable jacket 102 such that sensing fibers 36 and 38 are located between the shorter sides 106 of rectangular strength element 104 and the shorter sides 108 of rectangular cable jacket 102. In such embodiments, the flat, rectangular shape of cable 100 may facilitate placement of cable 100 in the ground with axis 44 aligned horizontally (e.g., perpendicular to gravity). Applicant believes that such horizontal positioning may improve sensitivity of cable 100 to sound/vibration waves (e.g., see vibrations 18 and 20 in FIG. 1) by ensuring an orientation of cable 100 in the ground that positions sensing fibers 36 and 38 to receive sound/vibration waves traveling horizontally or vertically within the ground.

Figure 7:
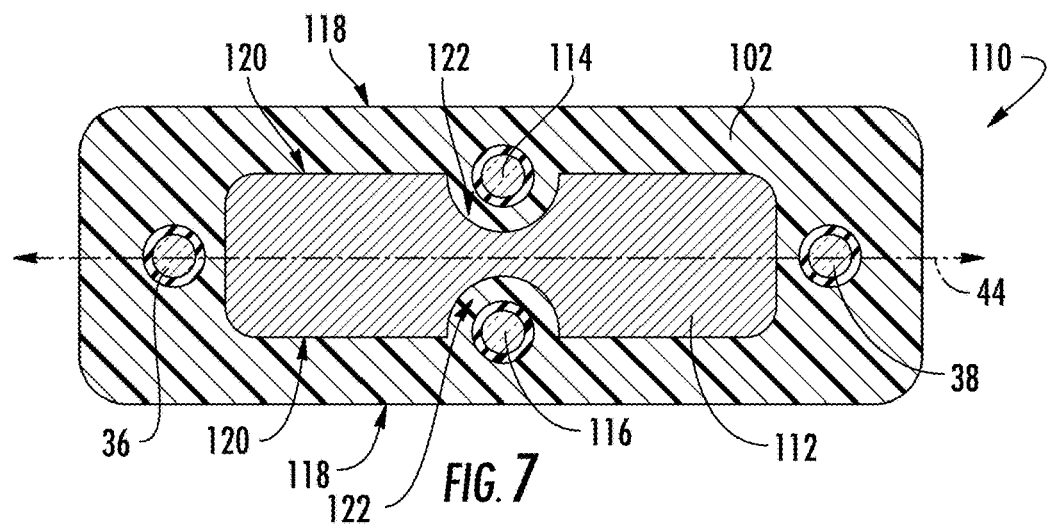
FIG. 7 shows a longitudinal cross-sectional view of a vibration sensing fiber optic cable, according to another exemplary embodiment.

Referring to FIG. 7, a strain or vibration sensing optical fiber cable 110 is shown according to an exemplary embodiment. Cable 110 is substantially the same as cable 100, except for the differences discussed herein. Cable 110 includes two additional sensing fibers, shown as sensing fibers 114 and 116. Sensing fibers 114 and 116 are located on opposite sides of strength element 112 along the vertical axis of cable 110. In this arrangement, sensing fibers 114 and 116 are located between the long sides 118 of rectangular jacket 102 and the long sides 120 of strength element 112. Sensing fibers 114 and 116 are positioned to provide unobstructed fields of view to the upper and lower (in the orientation of FIG. 7) surfaces of cable jacket 102. Thus, sensing fibers 114 and 116 when combined with sensing fibers 36 and 38 provide unobstructed fields of view to the entire perimeter/outer surface of cable 110.

In specific embodiments, strength element 112 is shaped to facilitate placement of sensing fibers 114 and 116 as shown in FIG. 7. In this embodiment, strength element 112 is shaped to include a pair of depressions, cut-outs or channels 122 located along the long sides 120 of strength element 112. Sensing fibers 114 and 116 are each located at least partially within one of the channels 122. This allows for cable 110 to support the additional sensing fibers 114 and 116 as shown in FIG. 7, without increasing the vertical outer dimension of cable jacket 102.

In addition, placement of sensing fibers 114 and 116 within channels 122 brings sensing fibers 114 and 116 closer to the neutral bending axis (shown as the horizontal axis 44 in FIG. 7) which in turn limits the amount of bending-based strain experienced by fibers 114 and 116. However, in some embodiments, because sensing fibers 114 and 116 do experience some bending-based strain, the strain-based scattering on fibers 114 and 116 can be measured/analyzed to determine the shape of cable 110 when deployed. As will be understood, positive strain on one of fibers 114 or 116 indicates that the fiber is on the outside of a bend and a negative strain on one of fibers 114 or 116 indicates that the fiber is on the inside of a bend. This strain information can be used to determine the position of and degree of bends along the length cable 110.

Figure 8:
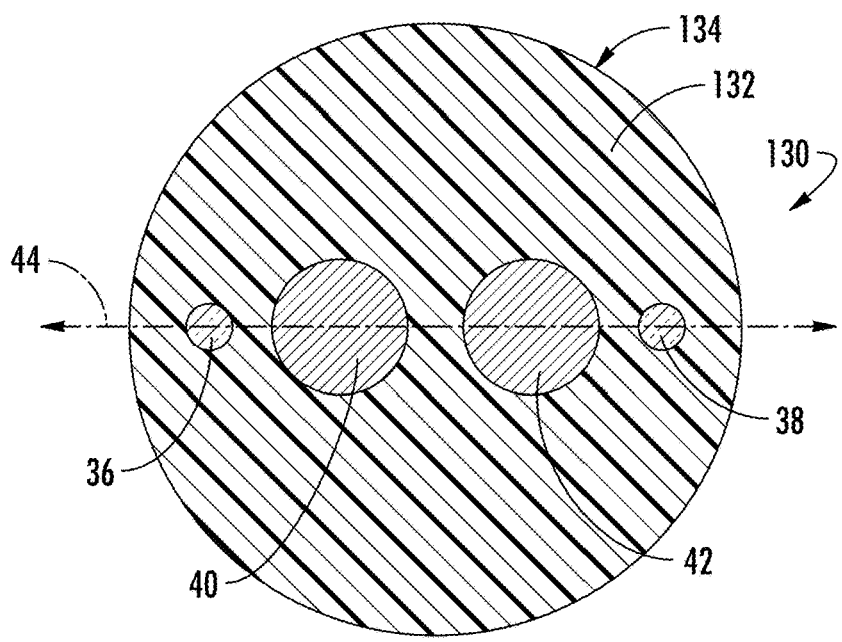
FIG. 8 shows a longitudinal cross-sectional view of a vibration sensing fiber optic cable, according to another exemplary embodiment.

Referring to FIG. 8, a strain or vibration sensing optical fiber cable 130 is shown according to an exemplary embodiment. Cable 130 is substantially the same as cable 30, except for the differences discussed herein. Cable 130 includes a generally cylindrical cable jacket 132 that defines an outer surface 134 having a generally circular cross-sectional shape. In this embodiment, the outer surface 134 is radially symmetric about the cable's longitudinal axis, while sensing fibers 36 and 38 and strength elements 40 and 42 are generally aligned along a common axis, shown as horizontal axis 44 in the orientation of FIG. 8. In this arrangement, even though outer surface 134 is radially symmetric, the arrangement of strength elements 40 and 42, as shown in FIG. 8, creates a preferential bend axis and sensing fibers 36 and 38 are located along the neutral axis, which limits their exposure to bending-related strain, as discussed above.

Figure 9:
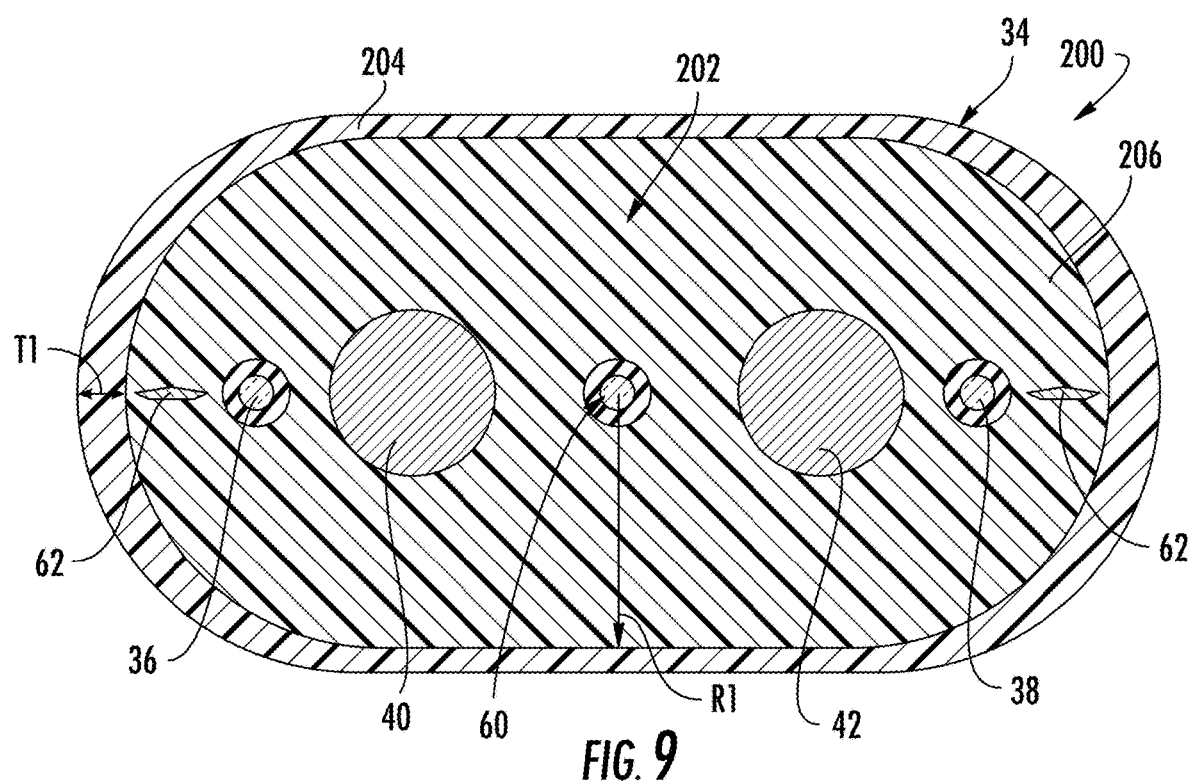
FIG. 9 shows a longitudinal cross-sectional view of a vibration sensing fiber optic cable, according to another exemplary embodiment.

Referring to FIG. 9, a strain or vibration sensing optical fiber cable 200 is shown according to an exemplary embodiment. Cable 200 is substantially the same as cable 30, except for the differences discussed herein. Cable 200 includes a cable jacket 202 that like cable jacket 32 surrounds and protects sensing fibers 36 and 38, strength members 40 and 42 and additional optical fiber(s) 60. However, cable 200 utilizes an impedance matching material, shown as outer cable jacket layer 204, and an inner cable jacket, shown as inner layer 206. In the embodiment shown in FIG. 9, sensing fibers 36 and 38 are embedded in the inner layer 206 such that layer 206 provides protection to fibers 36 and 38 from mechanical damage.

Outer layer 204 at least partially surrounds inner layer 206 (e.g., when viewed in longitudinal cross-section as shown in FIG. 9). In the specific embodiment shown in FIG. 9, outer layer 204 defines the outer most surface 34 of cable jacket 202 and completely surrounds inner layer 206. Outer layer 204 and inner layer 206 are each continuous, contiguous layers of material that extend the length of cable 200 (e.g., the entire length between the opposing first and second ends of the cable).

In general, outer layer 204 is formed from a material that provides for acoustic impedance matching between the material of the environment in which cable 200 is installed (e.g., ground 12 as shown in FIG. 1) and the material of inner layer 206. In such embodiments, the environment (e.g., ground 12 as shown in FIG. 1) has an acoustic impedance, $Z1$, outer layer 204 is formed from a first material that has an acoustic impedance, $Z2$, and inner layer 206 is formed from a second material that has an acoustic impedance, $Z3$.

In various embodiments, such as a buried cable, perimeter monitoring application shown in FIG. 1, $Z2$ is less than $Z3$. In such embodiments, outer layer 204 has an acoustic impedance $Z2$ that is greater than $Z1$ and is less than $Z3$. As can be seen through an application of Equation 1 and as will be discussed in more detail below regarding FIG. 10 and Table 1, interposing the impedance matching material of outer layer 204 between the environment and inner layer 206 decreases the amount of vibrational power reflected at the material interfaces between the environment and sensing fibers 36 and 38. This decrease in reflected vibrational power provided by the acoustic impedance matching of outer layer 204 translates into a significant increase in the proportion of vibrational energy that is allowed to reach sensing fibers 36 and 38.

Figure 10:
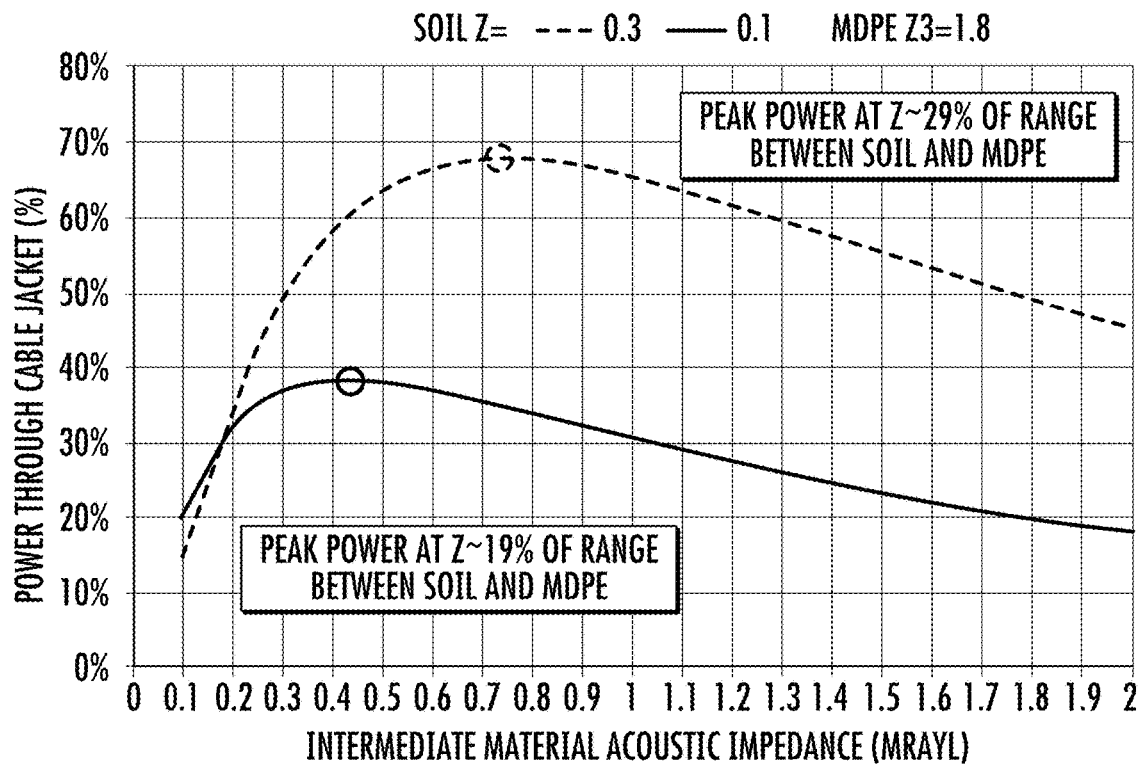
FIG. 10 is a plot showing the relationship of acoustic impedance of an impedance matching material to vibration power transmission through a cable jacket, according to an exemplary embodiment.

As will generally be understood, the acoustic impedance $Z2$ of the material of outer layer 204 typically is selected based on a balance between the matching acoustic impedance of the environment and matching the acoustic impedance of inner layer 206. This balance related to the acoustic impedance of an impedance matching material in a buried cable application is depicted in FIG. 10. In specific embodiments, $Z2$ is less than 85% of $Z3$, specifically is between 10% and 80% of $Z3$ and more specifically is between 20% and 70% of $Z3$. However, in some embodiments where the environment has a high acoustic impedance (e.g., a metal conduit or other structure), $Z2$ may be greater than $Z3$.

In specific embodiments, outer layer 204 is formed from a first polymer material, and inner layer 206 is formed from a second polymer material. In general, the first polymer material has a different acoustic impedance than the second polymer material, and in applications for use in environments where $Z1$ is less than $Z3$, $Z2$ is less than $Z3$ and greater than $Z1$ in order to decrease the impedance mismatch from the environment to the cable jacket. In specific embodiments, Z2 is between 0.3 and 2 MRayl, and Z3 is between 1 and 2.5 MRayl. In other specific embodiments, Z2 is between 0.4 and 1.4 MRayl, and Z3 is between 1.5 and 2 MRayl. In another specific embodiment, Z2 is between 0.8 and 2 MRayl, and specifically is 0.9 MRayl. In some embodiments, cable 200 with these acoustic impedances ranges is intended for use in a ground-based vibration detection system, where the ground typically has an acoustic impedance between 0.1 MRayl and 0.3 MRayl. In various embodiments, inner layer 206 is an olefin material, such as low density polyethylene medium density polyethylene, a high density polyethylene, polypropylene, etc., and outer layer 204 is at least one of a silicone rubber material, an ethylene vinyl acetate material and a polyurethane material.

Further as will generally be understood, specific acoustic impedance is a function of the modulus of elasticity of the material, E, and the density of the material, ρ, as shown by the following equation, Equation 2: $Z=(\rho E)^{1/2}$. In various embodiments, outer layer 204 is formed from a material having a density, $\rho_1$, and a Young's modulus of elasticity, $E_1$, and inner layer 206 is formed from a material that has a density, $\rho_2$, and a Young's modulus of elasticity, $E_2$. Thus, in specific embodiments, the materials of outer layer 204 and inner layer 206 are selected such that $(\rho_1 E_1)^{1/2}$ is less than $(\rho_2 E_2)^{1/2}$.

In specific embodiments, outer layer 204 is formed from a polymer material that has a Young's modulus of elasticity between 150 and 700 MPa, specifically 160 MPa to 650 MPa, and more specifically of 165 MPa or 640 MPa, and inner layer 206 is formed from a polymer material that has a Young's modulus of elasticity between 300 and 1000 MPa. In such embodiments, outer layer 204 is formed from a polymer material that has a density between 1.1 and 1.3 g/cm$^3$, and inner layer 206 is formed from a polymer material that has a density between 0.91 and 0.97 g/cm$^3$. In a specific embodiment, outer layer 204 is a thermoplastic polyurethane elastomer material having a density of 1.2 g/cm$^3$ and a Young's modulus of elasticity between 200 and 500 MPa.

Still referring to FIG. 9, in various embodiments, the relative thicknesses of layers 204 and 206 are selected to limit attenuation of vibrations during transmission through jacket 202. Limiting this attenuation within outer layer 204 may be particularly important when a low modulus material, but higher attenuation material, is used for outer layer 204. Thus as shown in FIG. 9, outer layer 204 has an average thickness, represented by T1, and inner layer has an average radial dimension, represented by R1. The average thickness T1 is the average thickness of outer layer 204 around the entire perimeter of inner layer 206, and the average radial dimension R1, is the average radial dimension of inner layer 206 around the entire perimeter of inner layer 206. In various embodiments, T1 is less than 30% of R1, specifically is less than 15% of R1 and more specifically is less than 10% of R1. In various embodiments, T1 is 10% to 30% of R1, and specifically T1 is 10% to 15% of R1.

Referring to FIG. 9 and FIG. 1, system 10 may utilize an impedance matching material to improve the sensitivity of cable 16 to vibrations within the environment. In such embodiments, cable 16 is in contact with the environment, specifically ground 12, such that vibrations in the ground are transmitted into cable 16. In various embodiments, system 10 includes an impedance matching material located between ground 12 and the outer surface of cable 16. In such embodiments, the impedance matching material is in contact with ground 12 and with the cable jacket of cable 16 such that vibrations within ground 12 are transmitted from ground 12 into the impedance matching material then into the cable jacket of cable 16. The vibrations are then transmitted through the cable jacket to the sensing optical fiber of cable 16 (e.g., sensing fibers 36 and 38) which in turn causes optical scattering which is detected by vibration sensing electronics 14, as discussed above.

In embodiments of system 10 that utilize cable 200, this impedance matching material is outer layer 204, as discussed above. However, in other embodiments, the impedance matching material may be a separate component or material positioned between the environment and cable 16 to provide the impedance matching functionality discussed above regarding outer layer 204. In embodiments where the acoustic impedance of the environment (e.g., ground 12) is less than the acoustic impedance of the material of the cable jacket of cable 16, the acoustic impedance of the impedance matching material is greater than the acoustic impedance of the environment and less than the acoustic impedance of the cable jacket.

For example in some such embodiments, the separate impedance matching material may be an oil material (e.g., mineral oil), a gel material and/or a polymer material (e.g., SAP polymer material) that is added to ground 12 in order to raise the impedance of the area of the ground immediately adjacent cable 16. In specific embodiments, cable 16 is at least partially buried within ground 12 and the separate impedance matching material is added to ground within the trench or channel adjacent cable 16. In some embodiments, a separate impedance matching material may be used in combination with cable 200 to provide two layers of impedance matching material.

In various embodiments, the sensitivity of system 10 utilizing a vibration sensing cable, such as cables 30, 200, etc., can be evaluated in terms of vibrational power transfer across the cable jacket to the sensing optical fiber(s) 36 and/or 38. In specific embodiments, the cable jacket of cable 16 is configured such that at least 25% of the power of vibrations in the environment, such as ground 12, that are incident on the outer surface of the cable jacket of cable 16 is transmitted through the cable jacket to at least one of sensing optical fibers 36 and 38. In a more specific embodiment, the cable jacket of cable 16 is configured such that at least 50% of the power of vibrations in the environment, such as ground 12, that are incident on the outer surface of the cable jacket of cable 16 is transmitted through the cable jacket to at least one of sensing optical fibers 36 and 38. In specific embodiments, power transfer proportions are calculated based on the environment and cable jacket materials utilizing equation 1 above, and in other embodiments, power transfer proportions are determined via testing.

In a specific embodiment, the cable jacket of cable 16 is configured such that at least 25% of the power of vibrations in the environment, such as ground 12, that are incident on the outer surface of the cable jacket of cable 16 is transmitted through the cable jacket to at least one of sensing optical fibers 36 and 38, when the acoustic impedance, Z1, of ground 12 is 0.1 MRayl. In another specific embodiment, the cable jacket of cable 16 is configured such that at least 50% of the power of vibrations in the environment, such as ground 12, that are incident on the outer surface of the cable jacket of cable 16 is transmitted through the cable jacket to at least one of sensing optical fibers 36 and 38, when the acoustic impedance, Z1, of ground 12 is 0.3 MRayl.

As will be understood, in order to provide a desired level of impedance matching, the acoustic impedance of the impedance matching material, whether in the form of outer layer 204 of cable 200 or a separate impedance matching material added to the environment, will be selected to be relatively close to the acoustic impedance of the environment carrying the vibrations. In specific embodiments, the acoustic impedance of the impedance matching material, Z2, is within 2 MRayl, specifically within 1.1 MRayl and more specifically within 0.4 MRayl, of the acoustic impedance of the environment, Z1. In a specific embodiment where the environment is ground 12, ground 12 may have an acoustic impedance of 0.1 to 0.3 MRayl.

Figure 11:
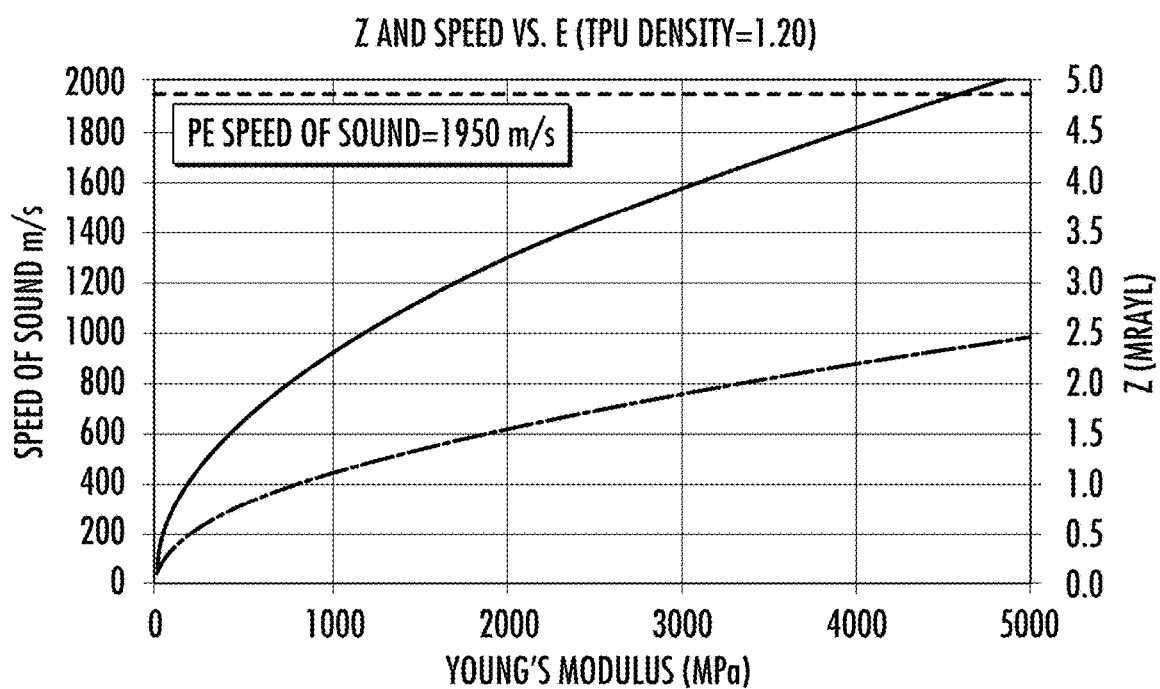
FIG. 11 shows a plot of the relationships of impedance and speed of sound vs. modulus of elasticity assuming TPU density of 1.2 g/cm³ according to an exemplary embodiment.

Referring to FIGS. 10 and 11 and Table 1 below, modeling data for acoustic transmission from the ground through a variety of cable jackets having different material properties and layer configurations are shown and described.

TABLE 1

| Mat 1 | Z1 | Mat 2 | Z2 | $P_t12$ | Mat 3 | Z3 | $P_t23$ | $P_t13$ |
|---|---|---|---|---|---|---|---|---|
| Ground | 0.3 | HDPE | 2.3 | 41% | | | | |
| | 0.1 | | 2.3 | 16% | | | | |
| Ground | 0.3 | MDPE | 1.8 | 49% | | | | |
| | 0.1 | | 1.8 | 20% | | | | |
| Ground | 0.3 | MDPE | 1.8 | 49% | MDPE | 1.8 | 100.0% | 49% |
| | 0.1 | | 1.8 | 20% | MDPE | 1.8 | 100.0% | 20% |
| Ground | 0.3 | Dow Silastic Rubber GP45, 45 Durometer | 1.16 | 65% | MDPE | 1.8 | 95.3% | 62% |
| | 0.1 | | 1.16 | 29% | MDPE | 1.8 | 95.3% | 28% |
| Ground | 0.3 | Impedance Matched Material | 0.73 | 83% | MDPE | 1.8 | 82.1% | 68% |
| | 0.1 | | 0.43 | 61% | MDPE | 1.8 | 62.3% | 38% |

Table 1 shows modeling data for vibration power transmission from the ground through cable jackets having one layer of either HDPE or MDPE (top six rows). In addition, Table 1 shows modeling data for vibration power transmission from the ground through cable jackets having outer layers 204 of either Silastic Rubber GP45 from Dow Chemical or a calculated Impedance Matched Material and an inner layer 206 of MDPE.

As can be seen in Table 1, both Silastic Rubber GP45 and the Impedance Matched Material increase vibration power transmission percentage (shown in column $P_t13$) compared to the single layer MDPE or HDPE jacket materials (shown in column $P_t12$). Specifically, Table 1 shows the estimated power transmission gains through use of the calculated acoustic Impedance Matched Material is between about 22% and 27% relative to a typical HDPE cable jacket and between about 8-13% for use Silastic Rubber GP45 material relative to a typical HDPE cable jacket.

FIG. 10 is a plot showing the effect of the acoustic impedance, Z2, of the material of outer layer 204, on vibration power transmission utilizing a inner layer 206 of MDPE having a Z3 of 1.8 MRayl for soil having a Z1 of both 0.1 and 0.3. As will be understood, the shape of the curves in FIG. 10 illustrate the balance between matching the environment's acoustic impedance and the cable jacket's acoustic impedance when selecting an acoustic impedance matching material. In addition, from these plots the 0.43 MRayl and 0.73 MRayl values for Z2 of the calculated Impedance Matched Material, shown in Table 1, are determined. In such embodiments, the TPU material having the acoustic impedance 0.43 MRayl has a modulus of elasticity of 155 MPa, and the TPU material having the acoustic impedance 0.73 MRayl has a modulus of elasticity of 640 MPa, FIG. 11 shows a plot of the relationships of impedance and speed of sound vs. modulus of elasticity assuming TPU density of 1.2 g/cm$^3$. Thus, FIG. 11 shows that for a TPU density of 1.2 g/cm$^3$, a TPU materials (specifically Irogran A80P with a specific gravity of 1.09, available from Huntsman) a speed of sound based calculated modulus of elasticity in the range of 155 MPa and 640 MPa would result in acoustic impedances of 0.43 to 0.73 MRayl, respectively.

Figure 12:
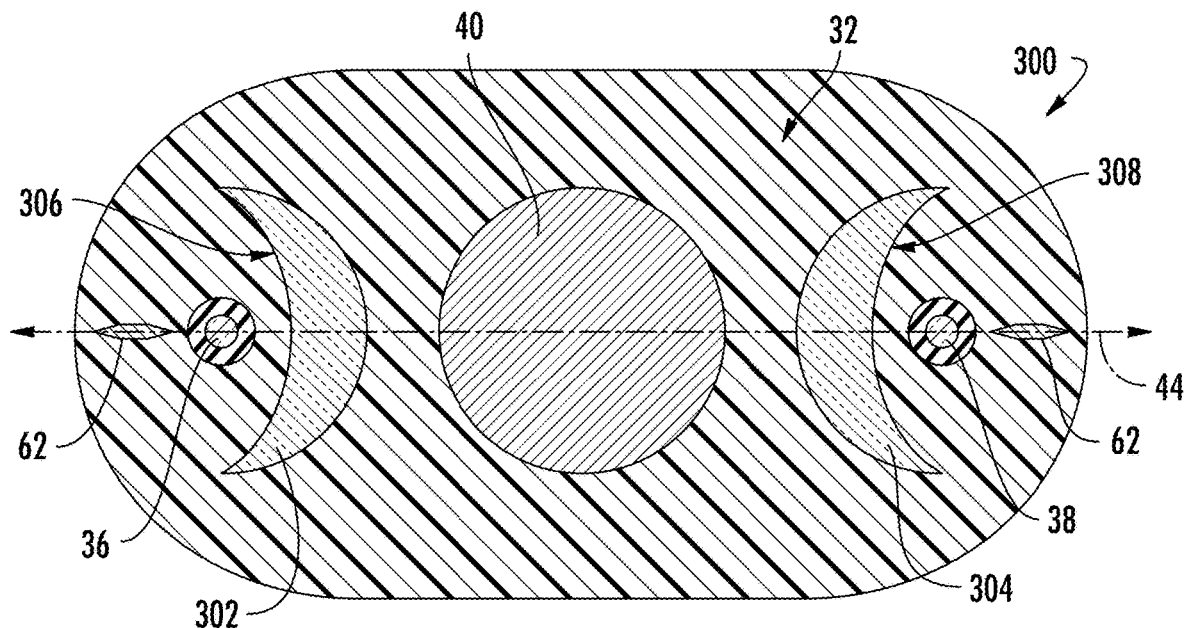
FIG. 12 shows a longitudinal cross-sectional view of a vibration sensing fiber optic cable, according to another exemplary embodiment.

Referring to FIG. 12, a strain or vibration sensing optical fiber cable 300 is shown according to an exemplary embodiment. Cable 300 is substantially the same as cable 30, except for the differences discussed herein. Cable 300 includes one or more acoustic reflector, shown as reflectors 302 and 304, embedded in cable jacket 32. In general, reflectors 302 and 304 are formed from a material that has an acoustic impedance greater than the acoustic impedance of the material of cable jacket 32. Reflector 302 has a vibration-reflecting surface, shown as concave surface 306, and reflector 304 has a vibration-reflecting surface, shown as concave surface 308. As shown in FIG. 12, reflectors 302 and 304 are embedded in the material of cable jacket 32 such that the material of cable jacket 32 is in contact with surfaces 306 and 308, and specifically, cable jacket 32 may surround reflectors 302 and 304 such the reflectors are completely embedded within cable jacket 32.

Figure 13:
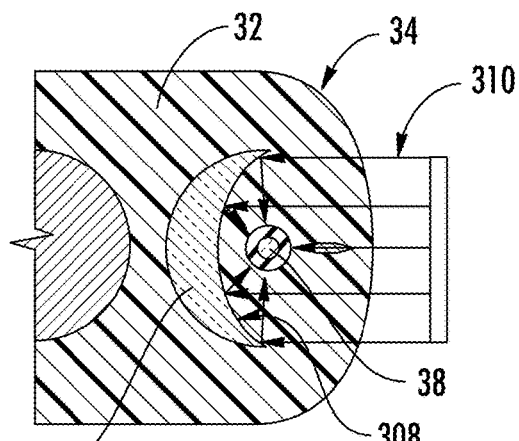
FIG. 13 shows a detailed view of an acoustic reflector of the cable of FIG. 12, according to an exemplary embodiment.

Referring to FIG. 13, a detailed view of reflector 304 is shown illustrating vibrational reflection provided by reflector 304. It should be understood that reflector 302 functions the same as reflector 304. Vibrational waves, shown schematically as horizontal vibrations 310, are transmitted through a portion of outer surface 34 into cable jacket 32. The horizontal vibrations 310 continue to travel through cable jacket 32 until they encounter reflector 304. As illustrated by Equation 1 above, a large portion of the power of vibrations 310 reflect off of reflector 304 due to the acoustic impedance difference between the material of reflector 304 and of the material of jacket 32. The concave shape of surface 308 reflects portions of vibrations 310 (that would have otherwise missed sensing fiber 38) toward sensing fiber 38.

As will be understood from Equation 1, the greater the acoustic impedance difference between the material of reflectors 302 and 304 and of cable jacket 32, the larger the proportion of vibrational power that is reflected back toward sensing fibers 36 and 38. In various embodiments, the acoustic impedance of the material of reflectors 302 and 304 is at least twice, specifically is at lease 5× and more specifically is at least 10× of the acoustic impedance of the material of cable jacket 32.

A wide variety of materials may be used to form reflectors 302 and 304. In some embodiments, reflectors 302 and 304 may be formed from a high acoustic impedance polymer material, and in such embodiments reflectors 302 and 304 may be coextruded with jacket 32. In other embodiments, reflectors 302 and 304 may be separate structures around which jacket 32 is extruded. In exemplary embodiments, reflectors 302 and 304 may be a metal material or a high density polymer material, and in a specific embodiment, reflectors 302 and 304 may be formed from an aluminum Mylar material.

As shown in FIG. 12, sensing fibers 36 and 38 are located along horizontal axis 44 and are positioned adjacent opposite ends of cable jacket 32 with strength member 40 in between the two sensing fibers. In this arrangement, reflector 302 is located between sensing fiber 36 and tensile strength member 40 along horizontal axis 44, and reflector 304 is located between sensing fiber 38 and tensile strength member 40 along horizontal axis 44. In this arrangement, reflecting surfaces 306 and 308 face in opposite directions from each other along horizontal axis 44. In the particular embodiment shown in FIG. 12, strength element 40 is a centrally located strength element that is coaxial with the longitudinal axis of cable 300 and is equidistant from reflectors 302 and 304 and from sensing fibers 36 and 38. In other embodiments, two strength elements and/or additional optical fibers may be located along horizontal axis 44 between reflectors 302 and 304.

As shown in FIG. 12, reflectors 302 and 304 are positioned and shaped different from other materials/layers that may be found in typical fiber optic cables. For example, unlike typical buffer tubes or wrapped armor layers, concave surfaces 306 and 308 of reflectors 302 and 304 are in contact with the material of cable jacket 32. In addition, concave surfaces 306 and 308 of reflectors 302 and 304 define arc angles less than 360 degrees (i.e., they do not circumscribe fibers 36 and 38), specifically less than 270 degrees, and more specifically less than 180 degrees.

In specific embodiments, cable 300 has a width dimension (in the horizontal direction in the orientation of FIG. 12) between 3 mm and 4 mm, specifically of 3.5 mm, and a height dimension (in the vertical direction in the orientation of FIG. 12) between 1 mm and 2 mm, specifically of 1.8 mm. In such embodiments, strength member 40 has an outer diameter of 1 mm. In such embodiments, the height of reflectors 302 and 304 is between 0.5 mm and 2 mm and specifically is 1 mm. In such embodiments, sensing fibers 36 and 38 are located a distance of between 0.1 mm and 0.5 mm, and specifically 0.25 mm from surfaces 306 and 308, respectively, along horizontal axis 44.

Figure 14:
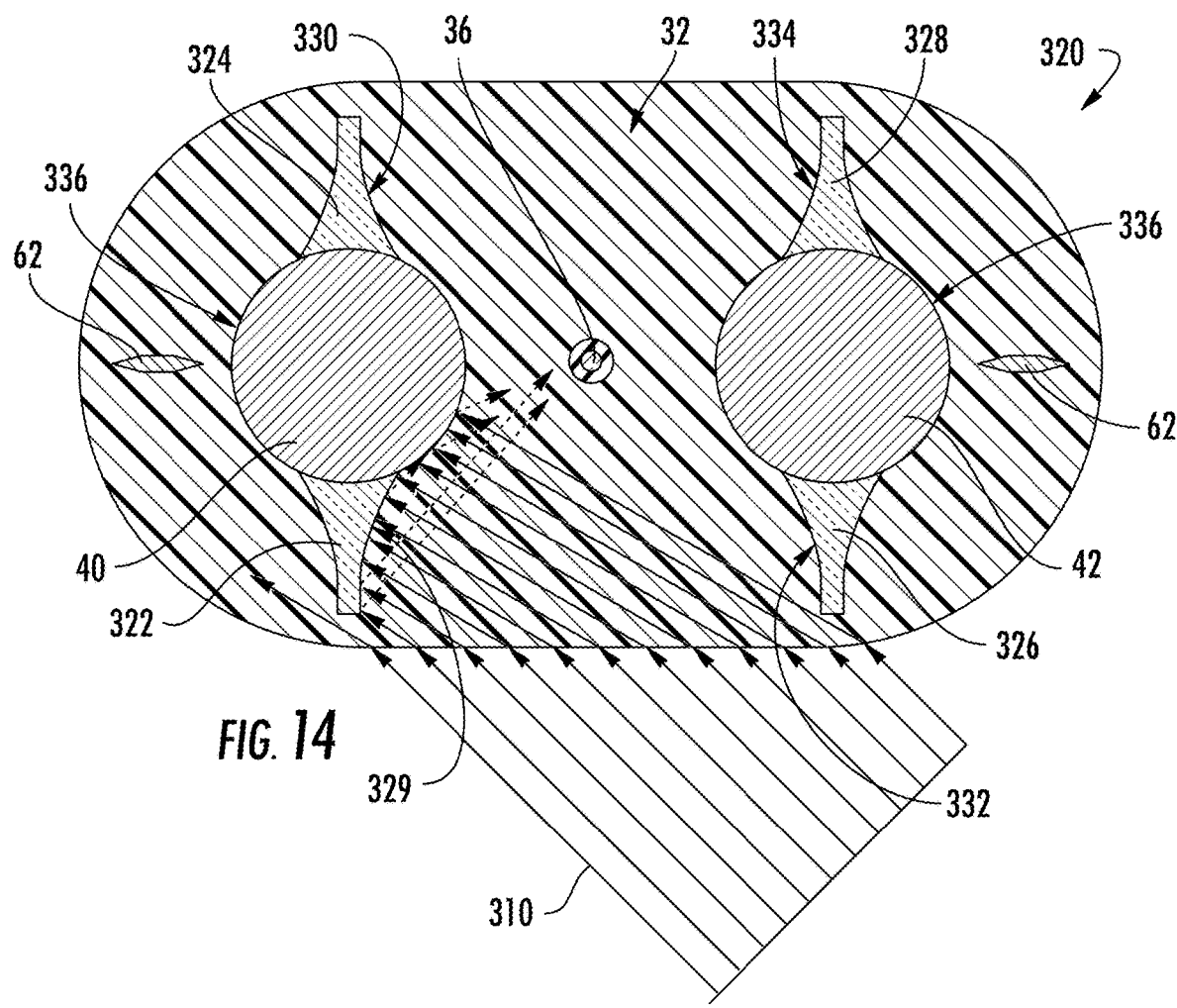
FIG. 14 shows a longitudinal cross-sectional view of a vibration sensing fiber optic cable, according to another exemplary embodiment.

Referring to FIG. 14, a strain or vibration sensing optical fiber cable 320 is shown according to an exemplary embodiment. Cable 320 is substantially the same as cable 300, except for the differences discussed herein. Cable 320 includes a single sensing optical fiber 36 generally located along the central longitudinal axis of cable 320.

Cable 320 includes a first pair of acoustic reflectors, 322 and 324, and a second pair of acoustic reflectors, 326 and 328. Like the reflectors of cable 300, acoustic reflectors 322, 324, 326 and 328 are formed from a material having an acoustic impedance greater than the acoustic impedance of the material of cable jacket 32 and each has a concave vibration reflecting surface 329, 330, 332, 334, respectively.

The reflecting surfaces 329, 330, 332, 334, are shaped and positioned such that incoming vibration waves, shown schematically at 310, are reflected off of reflecting surfaces 329, 330, 332, 334 and directed toward sensing fiber 36. Specifically, concave reflecting surfaces 329, 330, 332, 334 each face sensing fiber 36 and are concave relative to sensing fiber 36. In other embodiments, acoustic reflectors 322, 324, 326 and 328 may have a variety of other shapes including bead shaped or rectangular shapes.

In the embodiment shown in FIG. 14, reflectors 322, 324, 326 and 328 are coupled to strength elements 40 and 42. In specific embodiments, reflectors 322, 324, 326 and 328 may be integral (e.g., coextruded, molded, etc.) with strength members 40, and in other embodiments, reflectors 322, 324, 326 and 328 may separate components embedded in jacket 32 adjacent to and contacting strength members 40 and 42. In some embodiments, strength members 40 and 42 and reflectors 322, 324, 326 and 328 are all formed from the same high acoustic impedance material as each other, and in another embodiment, reflectors 322, 324, 326 and 328 are formed from a material that is different from and has a higher acoustic impedance than the material of strength members 40 and 42.

As shown, each of strength elements 40 and 42 have a convex outer surface 336, and reflectors 322, 324, 326 and 328 are each coupled to the convex outer surface 336 of one of strength members 40 and 42. In such embodiments, reflectors 322, 324, 326 and 328 may provide both acoustic reflecting and additional strength to cable 320. In the particular arrangement shown, reflectors 322 and 324 are located on opposite sides of horizontal axis 44 from each other, and specifically are spaced 180 degrees from each other around strength element 40. Similarly, reflectors 326 and 328 are located on opposite sides of horizontal axis 44 from each other, and specifically are spaced 180 degrees from each other around strength element 42.

Figure 15:
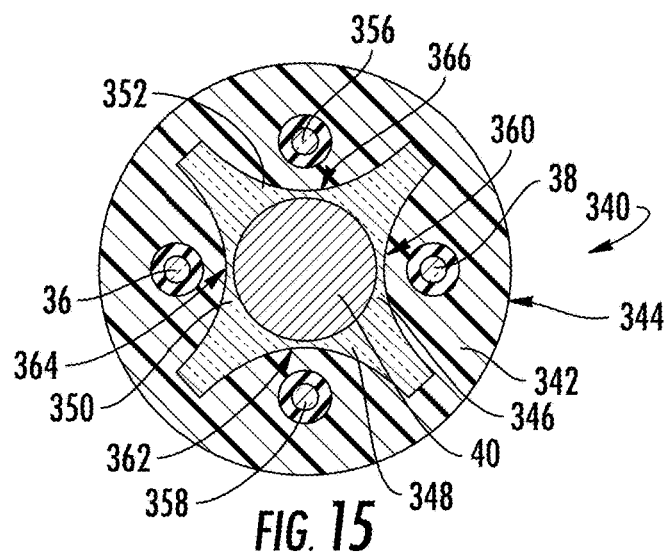
FIG. 15 shows a longitudinal cross-sectional view of a vibration sensing fiber optic cable, according to another exemplary embodiment.

Referring to FIG. 15, a strain or vibration sensing optical fiber cable 340 is shown according to an exemplary embodiment. Cable 340 is substantially the same as cable 320, except for the differences discussed herein. Cable 340 has a cylindrically shaped cable jacket 342 that defines a cylindrical outer surface 344. Cable 340 has a centrally located strength member 40.

Cable 340 includes a plurality of acoustic reflectors, shown as reflectors 346, 348, 350 and 352 coupled to and surrounding strength member 40. Reflectors 346, 348, 350 and 352 may be integral (e.g., coextruded, molded, etc.) with strength members 40, and in other embodiments, reflectors 346, 348, 350 and 352 may separate components embedded in jacket 342 adjacent to strength member 40. In some embodiments, strength member 40 and reflectors 346, 348, 350 and 352 are all formed from the same high acoustic impedance material as each other, and in another embodiment, reflectors 346, 348, 350 and 352 are formed from a material that is different from and has a higher acoustic impedance than the material of strength member 40.

As shown in FIG. 15, cable 340 includes sensing fibers 36 and 38 spaced from each other along horizontal axis 44 and a pair of additional sensing fibers 356 and 358 that are spaced from each other along the vertical axis of cable 340. Reflectors 346, 348, 350 and 352 have concave acoustic reflecting surfaces 360, 362, 364 and 366. Reflecting surfaces 360, 362, 364 and 366 each face and are concave relative to an associated sensing fiber such that incoming vibrations are reflected toward the associated sensing fiber.

In this arrangement, cable 340 includes four sensing fibers each spaced approximately 90 degrees from each other. In this arrangement cable 340 is radially symmetric. In this arrangement, cable 340 is configured to detect vibrations received from 360 degrees around the perimeter of cable 340 with one sensing fiber in each quadrant of the cable, while maintaining a small, compact form factor.

In a specific embodiment, cable 340 has an outer diameter between 1.5 mm and 3 mm, and specifically of 2 mm. In such embodiments, sensing fibers 36, 38, 356 and 358 have outer diameters of 250 microns. In such embodiments, the radial distance from the center point of strength member 40 to the center point of each sensing fibers 36, 38, 356 and 358 is between 0.2 mm and 1.3 mm and more specifically is 0.6 mm. In a specific embodiment, strength element 40 is a steel strength element having an outer diameter of 0.7 mm. Table 2 below shows the relation between the fiber offset positioning, bend radius and fiber strain for different arrangements of cable 340.

TABLE 2

| Max Additional Fiber Strain | Fiber Center Offset Distance (mm) | | | |
|---|---|---|---|---|
| Bend Radius (in) | 0.3 | 0.6 | 0.9 | 1.2 |
| 2 | 0.84% | 1.43% | 2.02% | 2.61% |
| 3 | 0.56% | 0.95% | 1.35% | 1.74% |
| 4 | 0.42% | 0.71% | 1.01% | 1.30% |
| 5 | 0.33% | 0.57% | 0.81% | 1.04% |
| 6 | 0.28% | 0.48% | 0.67% | 0.87% |
| 7 | 0.24% | 0.41% | 0.58% | 0.75% |
| 8 | 0.21% | 0.36% | 0.50% | 0.65% |
| 9 | 0.19% | 0.32% | 0.45% | 0.58% |
| 10 | 0.17% | 0.29% | 0.40% | 0.52% |
| 15 | 0.11% | 0.19% | 0.27% | 0.35% |
| 20 | 0.08% | 0.14% | 0.20% | 0.26% |

Figure 16:
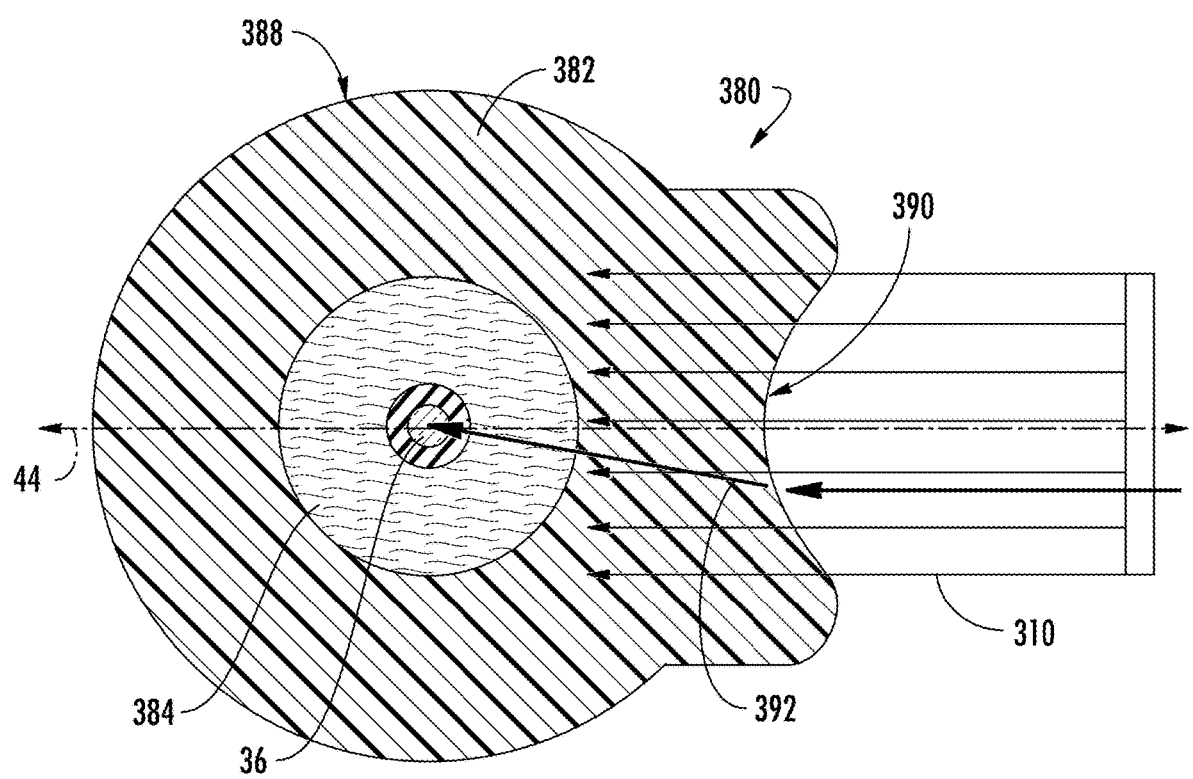
FIG. 16 shows a longitudinal cross-sectional view of a vibration sensing fiber optic cable, according to another exemplary embodiment.

Referring to FIG. 16, a strain or vibration sensing optical fiber cable 380 is shown according to an exemplary embodiment. Cable 380 is substantially the same as cable 30, except for the differences discussed herein. Cable 380 has a cable jacket 382, and a single optical sensing fiber 36. In this embodiment, sensing fiber 36 is a tight-buffered optical fiber having a tight buffer layer 384 coupled to and surrounding sensing fiber 36.

Cable 380 includes an outer surface 388 that surrounds sensing fiber 36. In the particular embodiment shown, cable jacket 382 defines a part or all of outer surface 388. In contrast to typical cable arrangements, outer surface 388 includes a concave portion 390 that is concave relative to the exterior of cable 380.

In general, concave surface 390 is shaped and positioned relative to sensing fiber 36 such that incoming vibrations, represented schematically at 310, are refracted as the incoming vibrations are transmitted into cable jacket 382. As shown schematically in FIG. 16, as vibrations 310 enter cable jacket 382 they are refracted to a new direction of travel or path 392. Concave surface 390 is shaped and/or positioned relative to sensing fiber 36 in a manner that increases the proportion of vibrations 310 that are directed toward sensing fiber 36. In particular, concave surface 390 is positioned such that is symmetric about an axis, shown as horizontal axis 44 that intersects sensing fiber 36.

As will be understood, the appropriate radius of curvature for the concave surface 390 will be determined based on the speed of sound in the jacket material used. The exact shape of the cable transition between region of planar only sensitivity to combined planar/reflected energy can be optimized depending on the strength of the planar wave vs. reflected wave. It is believed that the transition would be a function of depth of bedrock and distance from the vibration producing event to determine the ratio of planar wave energy to reflected wave energy.

Figure 18:
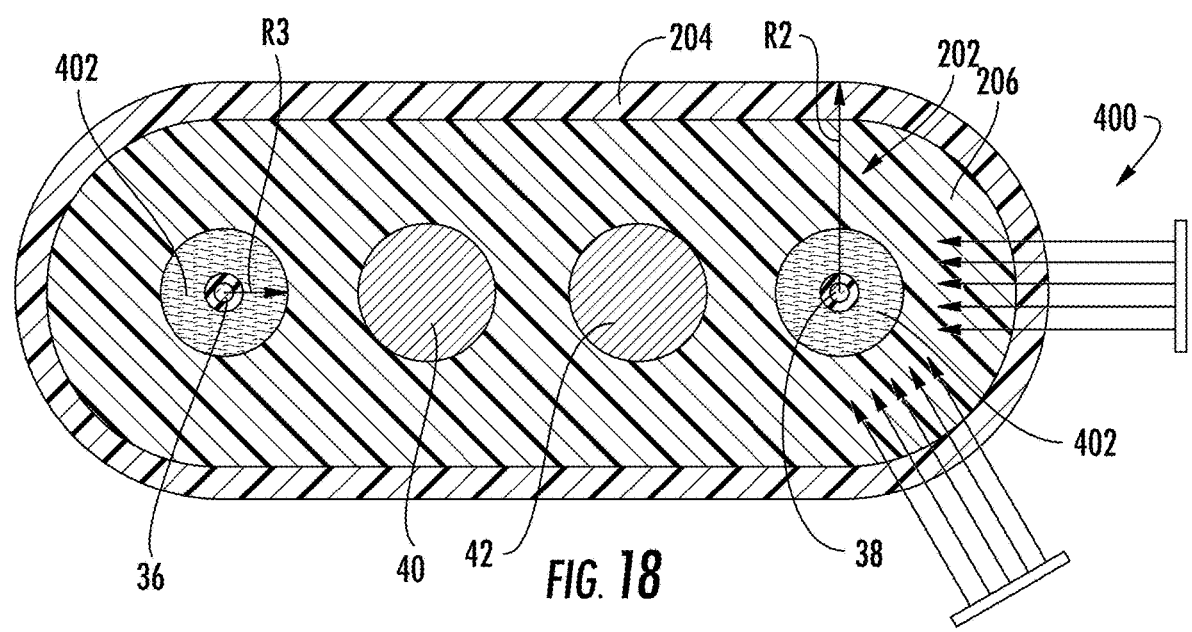
FIG. 18 shows a longitudinal cross-sectional view of a vibration sensing fiber optic cable, according to another exemplary embodiment.

Referring to FIGS. 17A, 17B and 18, in various embodiments, the radiuses of cable jackets (e.g., the radius of cylindrical cable jackets, the radiuses at the corners of oblong cable jackets, etc.) may be selected in relation to sensing fiber size and positioning to increase the proportion of vibrational energy directed toward the sensing fiber via refraction as the vibrations are transmitted into the cable jacket material. Referring to FIG. 17A and FIG. 17B, a model that takes into account the radius of curvature and dimensions of the cable jacket and of the fiber and how they apply to calculate a maximum potential angle for direct energy transfer are shown.

Based on this model, a limiting angle is determined based on the potential angular profile and the critical angle for reflectance that increase the proportion of vibrational energy directed toward the sensing fiber via refraction. Since the speed of sound in the cable jacket is higher than the surrounding soil, FIG. 17B shows that acoustic waves will be refracted out away from the center of the cable. Thus, to counter the tendency to refract acoustic waves away from the sensing fiber at the center of the cable, the curvature of the cable can be selected to increase the proportion of acoustic waves refracted toward the sensing fiber.

Referring to FIGS. 17A and 17B, the ability to transfer increased or maximum acoustic energy to a sensing fiber, such as fibers 36 and 38, from the soil is a function of both the cable materials and component dimensions. Assuming the sensing fiber is centered inside the radius of curvature of the outer surface of the jacket, the component dimensions for the sensing fiber and cable radius determine the potential angle for direct energy transfer ($2\theta_{cf}$) from the acoustic wave (see FIG. 17A). The critical angle for refractive energy transfer (Snell's Law) $\theta_{c1}$ is a function of material properties between the soil (or other environment) and the cable jacket. A limiting angle for energy transfer is determined by the limiting (smallest) value between the dimensional cable properties and the critical angle. This is observed in FIG. 17B where the speed of sound for soil is assumed to be 250 m/s. For this case, transfer of vibrations from soil to a polyethylene cable jacket, is limited to a maximum angular surface for energy transfer of 14.7 degrees due to the critical angle between the two materials. Above a cable radius of about 1 mm for 250 micron optical fiber and a cable radius of about 3.5 mm for 900 micron tight buffered optical fiber, the maximum angular surface for energy transfer is limited by the potential angle $2\theta_{cf}$.

Incorporating a material with a lower speed of sound will increase the effective region of acoustic energy transfer (see cable 200 in FIG. 9). For example, Dow Silastic Rubber (shown in Table 1 above) is limited to a maximum angular surface for energy transfer of 28.4 degrees (significantly greater than polyethylene). To obtain the benefit for 250 micron fiber, the cable radius should be below 1 mm, preferably at ~0.5 mm. To obtain the benefit for 900 micron tight buffered fiber, the cable radius should be below 3.5 mm, preferably at or below ~1.8 mm.

Thus, based on this analysis, relative sizing/positioning for the cable jacket radius and fiber diameter and positioning can be determined to increase transfer of vibrational energy to sensing fibers. In an exemplary embodiment, FIG. 18 shows a vibration sensing cable 400 that utilizes these concepts. Vibration sensing cable 400 is substantially the same as cable 200 except as discussed herein. Vibration sensing cable 400 is arranged based on the modeling shown in FIGS. 17A and 17B to increase refraction-based vibration direction to sensing fibers 36 and 38.

As shown in FIG. 18, sensing fibers 36 and 38 each include a tight buffered layer 402. In this embodiment where sensing fibers 36 and 38 are tight buffered optical fibers, the tight buffer layer 402 defines the outer fiber radius shown as R3. In embodiments, where sensing fibers 36 and 38 are not surrounded by tight buffer layer 402, R2 is measured to the outer surface of coating layer 52 shown for example in FIG.

2. In addition, the end sections of cable jacket 200 (adjacent to and surrounding sensing fibers 36 and 38) are defined by a radius shown as R2.

As discussed above regarding FIGS. 17A and 17B, R2 may be selected to improve the proportion of vibrational energy directed toward sensing fibers 36 and 38 via refraction. Specifically, Applicant has determined that by shaping cable jacket 200 such that R2 is less than 8 times R3, vibrational energy transfer to sensing fibers 36 and 38 can be increased. In specific embodiments, R2 is less than eight times R3. In even more specific embodiments, R3 is 450 microns and R2 is less than 3.6 mm and more specifically is less than or equal to 1.8 mm. In another specific embodiment, R3 is 125 microns and R2 is less than 1 mm and more specifically is less than or equal to 0.5 mm.

In various embodiments, a method of detecting vibrations in an environment utilizing a vibration sensing optical cable is provided. In various embodiments, the method discussed herein may utilize any combination of the acoustic sensing enhancement designs of any of the cable embodiments discussed herein. In specific embodiments, the method includes the step of placing a vibration sensing cable in the environment (e.g., ground 12). In such embodiments, the vibration sensing cable includes a cable jacket defining an outer surface of the vibration sensing cable, and a vibration sensing optical fiber embedded within the cable jacket. The cable is positioned such that the outer surface of the vibration sensing cable is in contact with the environment forming an interface between the outer surface and the environment. The cable utilized in this method may be any of the cable embodiments discussed herein.

The method includes transmitting vibrational waves within the environment into the cable jacket through the interface. As will be understood, the vibrational waves have a direction of travel within the environment. The method includes altering the direction of the vibrational waves from the direction of travel within the environment to a path of travel within the cable jacket that intersects the vibrational-sensing optical fiber.

In one embodiment, the step of altering the direction of the vibrational waves is accomplished with an acoustic reflector (such as the reflectors of cables 300, 320 and/340 discussed above) positioned within the cable jacket that reflects vibrational waves traveling within the cable jacket toward the vibration sensing optical fiber. In another embodiment, the step of altering the direction of the vibrational waves is accomplished with a concave surface (e.g., the concave surface of cable 380 discussed above) located along the outer surface of the cable jacket. The concave surface is positioned relative to the vibrational waves such that refraction of the vibrational waves incident at the concave surface directs the vibrational waves traveling within the cable jacket toward the vibration sensing optical fiber.

In yet other embodiments, the direction of vibrational wave travel is altered utilizing refraction by selecting the radius of curvature of the cable jacket based on the size and positioning of the sensing fiber. In one such embodiment, the cable used in the method is cable 400 as discussed above. In such embodiments, the direction of vibrational waves is altered through refraction by forming the cable jacket such that R2 is less than 8 times R3. In a specific embodiment, the direction of vibrational waves is altered through refraction by forming the cable jacket such that R2 is less than 3.6 mm when R3 is 450 microns and more specifically R2 is less than or equal to 1.8 mm when R3 is 450 microns. In a specific embodiment, the direction of vibrational waves is altered through refraction by forming the cable jacket such that R2 is less than 1 mm when R3 is 125 microns and more specifically R2 is less than or equal to 0.5 mm when R3 is 125 microns.

The optical fibers discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical transmission elements discussed herein can include a wide variety of optical fibers including multi-mode fibers, single mode fibers, bend insensitive/resistant fibers, etc. In other embodiments, the optical cables discussed herein may include multi-core optical fibers, and in this embodiment, each optical transmission element may be a single, integral optical structure having multiple optical transmission elements (e.g., multiple optical cores surrounded by cladding).

In accordance with yet other aspects of the present disclosure, vibration sensing cables may include a cable jacket defining an outer surface having specific contoured patterns formed or provided on the outer surfaces of the cable to create an interference fit with the ground environment when the cable is installed into the ground environment. For example, the contoured pattern may include a pattern of ridges and valleys mechanically formed into the outer jacket wherein aspects of the ground environment may fill in or, for example, in the case of concrete or asphalt, flow into the contoured pattern to create increased friction when the ground environment settles or the concrete or asphalt cures. The increased friction in combination with aspects of a pliable polyethylene jacket and the strength of the strain sensing cables disclosed herein can assist in the survivability rate of cables when cracks occur in the ground environment, such as in a concrete bridge section or roadway. In many cases, the displacement that results from crack formation occurs instantaneously. The contoured patterns may enable the cable jacket to provide a degree of yield and absorb the infinite forces created by instantaneous displacement from zero to crack width so that the optical fibers and cable survive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A vibration sensing cable comprising:
a cable jacket comprising:
an outer layer defining an outermost surface of the cable jacket, the outer layer formed from a first polymer material;
an inner layer surrounded at least in part by the outer layer, the inner layer formed from a second polymer material;
wherein the first polymer material has an acoustic impedance that is less than about 85% of an acoustic impedance of the second polymer material;
a sensing optical fiber embedded within the cable jacket; and
a tensile strength element embedded in the cable jacket.

2. The vibration sensing cable of claim 1, wherein the acoustic impedance of the first polymer material is between 0.3 and 2 MRayl and the acoustic impedance of the second polymer material is between 1 and 2.5 MRayl.

3. The vibration sensing cable of claim 1, wherein the acoustic impedance of the first polymer material is between 0.4 and 1.4 MRayl and the acoustic impedance of the second polymer material is between 1.5 and 2 MRayl.

4. The vibration sensing cable of claim 1, wherein the first polymer material has a Young's modulus of elasticity between 150 and 700 MPa, and the second polymer material has a Young's modulus of elasticity between 300 and 1000 MPa.

5. The vibration sensing cable of claim 1, wherein the outer layer has an average radial thickness that is less than about 30% of an average radial dimension of the inner layer.

6. The vibration sensing cable of claim 5, wherein the sensing optical fiber and the tensile strength element are embedded in the inner layer of the cable jacket, wherein the outer layer of the cable jacket completely surrounds the inner layer.

7. The vibration sensing cable of claim 1, further comprising:
a second sensing optical fiber embedded in the inner layer of the cable jacket;
wherein the sensing optical fiber is a first sensing optical fiber, and the first sensing optical fiber and the tensile strength element are embedded in the inner layer of the cable jacket;
wherein, when viewed in cross-section taken perpendicular to a longitudinal axis of the cable jacket, the cable jacket defines a first axis and a second axis;
wherein the first axis intersects the first sensing optical fiber, the second sensing optical fiber and the tensile strength element;
wherein the tensile strength element is located between the first sensing optical fiber and the second sensing optical fiber along the first axis;
wherein the second axis is perpendicular to the first axis and is located at the midpoint between the first and second sensing optical fibers;
wherein the first and second sensing optical fibers each have a length within plus or minus 0.5% of a length of the tensile strength element such that both the first and second sensing optical fibers experience strain caused by vibrations transmitted into the cable jacket.

8. The vibration sensing cable of claim 7, wherein an outer dimension of the cable jacket along the first axis is greater than an outer dimension of the cable jacket taken along the second axis, wherein the first sensing optical fiber is located adjacent to an outer surface of the cable jacket such that a minimum distance between the first sensing optical fiber and the outer surface of the cable jacket is less than or equal to 0.5 mm, wherein the second sensing optical fiber is located adjacent to the outer surface of the cable jacket such that a minimum distance between the second sensing optical fiber and the outer surface of the cable jacket is less than or equal to 0.5 mm.

9. The vibration sensing cable of claim 8, wherein the cable jacket has an oblong shape when viewed in cross-section taken perpendicular to the longitudinal axis of the cable jacket such that the outer dimension of the cable jacket measured along the first axis is at least twice the outer dimension of the cable jacket measured along the second axis.

10. The vibration sensing cable of claim 1, wherein the inner layer is an olefin material, and the outer layer of the cable jacket is at least one of a silicone rubber material, an ethylene vinyl acetate material and a polyurethane material.

11. The vibration sensing cable of claim 1, wherein the first polymer material has a density, $p_1$, and a Young's modulus of elasticity, $E_1$, and the second polymer material has a density, $p_2$, and a Young's modulus of elasticity, $E_2$, wherein $(p_1 E_1)^{1/2}$ is less than $(p_2 E_2)^{1/2}$.

12. A vibration monitoring system comprising:
a vibration sensing cable comprising:
a cable jacket defining an outer surface of the vibration sensing cable; and
a sensing optical fiber embedded within the cable jacket;
wherein the outer surface of the vibration sensing cable is in contact with an environment such that vibrations within the environment are transmitted from the environment into the cable jacket;
wherein the cable jacket is configured such that at least 25% of the power of vibrations in the environment that are incident on the outer surface of the cable jacket is transmitted through the cable jacket to the sensing optical fiber; and
vibration monitoring electronics coupled to the vibration sensing cable and configured to determine an aspect of vibration within the environment based on optical scattering, caused by the vibrations, of an optical signal within the sensing optical fiber.

13. The vibration monitoring system of claim 12, wherein the cable jacket is configured such that at least 25% of the power of vibrations in the environment that are incident on the outer surface of the cable jacket is transmitted through the cable jacket to the sensing optical fiber when the environment has an acoustic impedance of 0.1 MRayl.

14. The vibration monitoring system of claim 12, wherein the cable jacket is configured such that at least 50% of the power of vibrations in the environment that are incident on the outer surface of the cable jacket is transmitted through the cable jacket to the sensing optical fiber.

15. The vibration monitoring system of claim 12, wherein the cable jacket is configured such that at least 50% of the power of vibrations in the environment that are incident on the outer surface of the cable jacket is transmitted through the cable jacket to the sensing optical fiber when the environment has an acoustic impedance of 0.3 MRayl.

16. The vibration monitoring system of claim 12, wherein the cable jacket comprises:
an outer layer defining the outer surface of the cable, the outer layer formed from a first polymer material; and
an inner layer surrounded at least in part by the outer layer, the inner layer formed from a second polymer material;
wherein an acoustic impedance of the first polymer material is between 0.3 and 2 MRayl greater than an acoustic impedance of a portion of the environment in contact with the outer surface of the vibration sensing cable.

17. The vibration monitoring system of claim 12, further comprising a layer of an acoustic impedance-matching material positioned between the environment and the outer surface of the vibration sensing cable, wherein the acoustic impedance matching material has an acoustic impedance greater than an acoustic impedance of the environment and less than an acoustic impedance of a material of the cable jacket.

18. The vibration monitoring system of claim 17, wherein the environment is a ground environment and the vibration sensing cable is buried in the ground environment and the acoustic impedance matching material is located in the ground environment between the ground environment and the outer surface of the vibration sensing cable.

19. A system for detecting vibrations in an environment comprising:
a vibration sensing cable comprising:
a cable jacket formed from a first material; and
a sensing optical fiber embedded within the cable jacket; and
an impedance matching material located between the cable jacket and the environment, the impedance matching material is in contact with the environment and with the cable jacket such that vibrations within the environment are transmitted from the environment into the impedance matching material and into the cable jacket and through the cable jacket to the sensing optical fiber;
wherein the impedance matching material has an acoustic impedance, $Z2$, and a portion of the environment in contact with the impedance matching material has an acoustic impedance, $Z1$;
wherein $Z2$ is within 2 MRayl of $Z1$.

20. The system of claim 19, wherein the impedance matching material surrounds and is bonded to the first material of the cable jacket, wherein the first material of the cable jacket has an acoustic impedance, $Z3$, wherein $Z2$ is less than $Z3$.

21. The system of claim 19, wherein the environment is a ground environment and the vibration sensing cable is buried in the ground environment and the acoustic impedance matching material is applied to the ground environment such that it is in contact with an outer surface of the cable jacket.

22. The system of claim 21, wherein the acoustic impedance matching material is at least one of an oil material and a polymer material added to soil adjacent the buried the vibration sensing cable.

* * * * *